United States Patent [19]
Seto

[11] Patent Number: 5,937,116
[45] Date of Patent: Aug. 10, 1999

[54] OPTICAL TRANSMISSION SYSTEM AND METHOD USING WAVELENGTH DIVISION MULTIPLEX

[75] Inventor: Ichiro Seto, Tokyo, Japan

[73] Assignee: Kabushiki Kaisha Toshiba, Kawasaki, Japan

[21] Appl. No.: 08/979,702

[22] Filed: Nov. 26, 1997

[30] Foreign Application Priority Data

Nov. 26, 1996 [JP] Japan ................................ 8-314852

[51] Int. Cl.$^6$ ....................................................... G02B 6/28
[52] U.S. Cl. ........................................... 385/24; 359/162
[58] Field of Search .............................. 385/24, 27, 37, 385/15; 359/135, 144, 110, 195, 181, 187, 160, 161, 177, 337, 629, 634; 372/6, 21, 12, 26, 38

[56] References Cited

U.S. PATENT DOCUMENTS

| | | | |
|---|---|---|---|
| 4,850,698 | 7/1989 | Kordts et al. | 356/434 |
| 4,864,648 | 9/1989 | Kordts et al. | 359/135 |
| 4,911,167 | 3/1990 | Corenman et al. | 600/324 |
| 5,140,656 | 8/1992 | Hasegawa et al. | . |
| 5,394,260 | 2/1995 | Suzuki et al. | 372/12 |
| 5,513,030 | 4/1996 | Epworth | 459/187 |
| 5,523,874 | 6/1996 | Epworth | . |
| 5,559,910 | 9/1996 | Taga et al. | 385/24 |
| 5,870,211 | 2/1999 | Oshida | 359/110 |

OTHER PUBLICATIONS

R.S. Vodhanel, et al., Conference, "OFC '96", Feb. 29, 1996, "Performance of an 8–Wavelength 8–Node WDM Ring Network Experiment with 80 Gb/s Capacity".

M. Suyama, et al., "Improvement of WDM Transmission Performance by Non–Soliton RZ Coding–A Demonstration using 5 Gb/s 8–channel 4500 km Straight Line Test Bed", OFC '96, Postdeadline Papers (Part A), Feb. 29, 1996, pp. PD26–1–PD26–5.

*Primary Examiner*—Akm E. Ullah
*Attorney, Agent, or Firm*—Oblon, Spivak, McClelland, Maier & Neustadt, P.C.

[57] ABSTRACT

A system for transmitting, over an optical transmission path using an optical fiber, wavelength-multiplex signals of a plurality of channels to which different wavelengths are assigned, the system comprising an optical transmission terminal station for transmitting the wavelength-multiplex signals to the optical transmission path, an optical reception terminal station for receiving the wavelength-multiplex signals from the optical transmission path, and at least one of ADD/Drop-Multiplexer nodes each including at least a demultiplexer unit for demultiplexing a plurality of channels to a channel in accordance with a given wavelength and a multiplexer unit for multiplexing a plurality of channels in accordance with a given wavelength, wherein optical pulses having pulse waveforms with an equal full-width at half-maximum are applied to the optical signals.

16 Claims, 13 Drawing Sheets

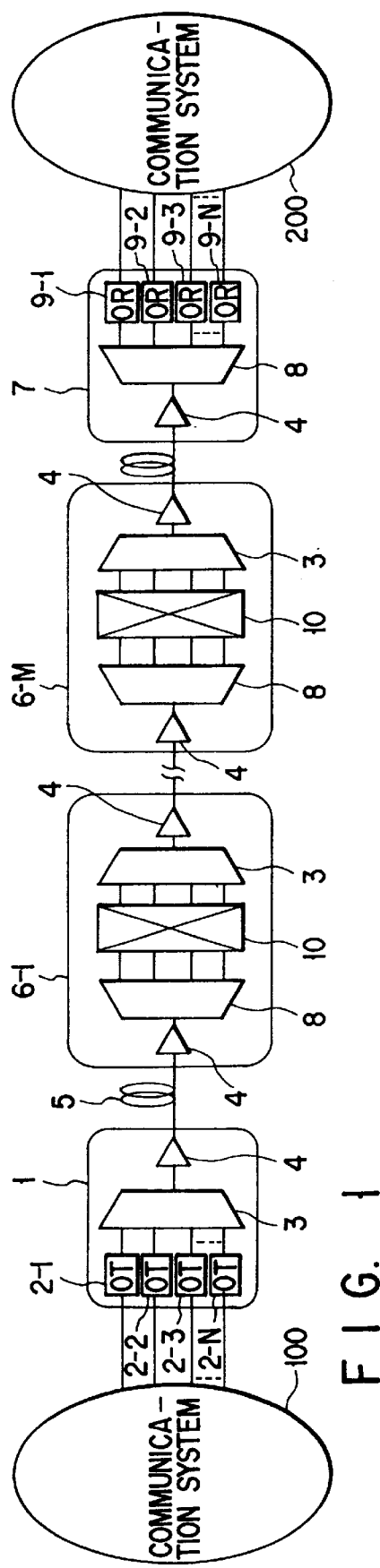
F I G. 1
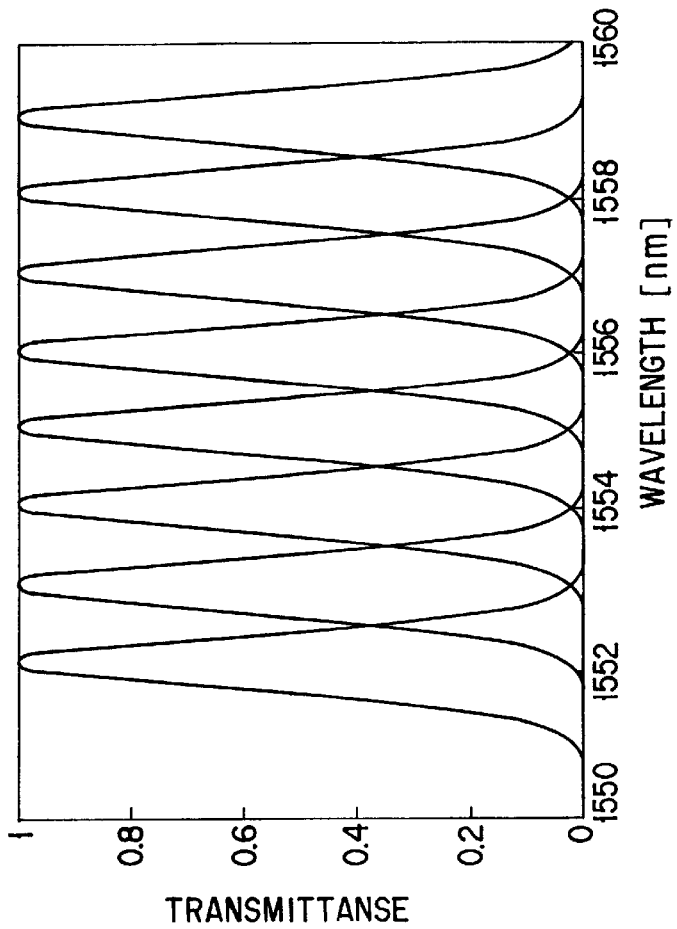
F I G. 2

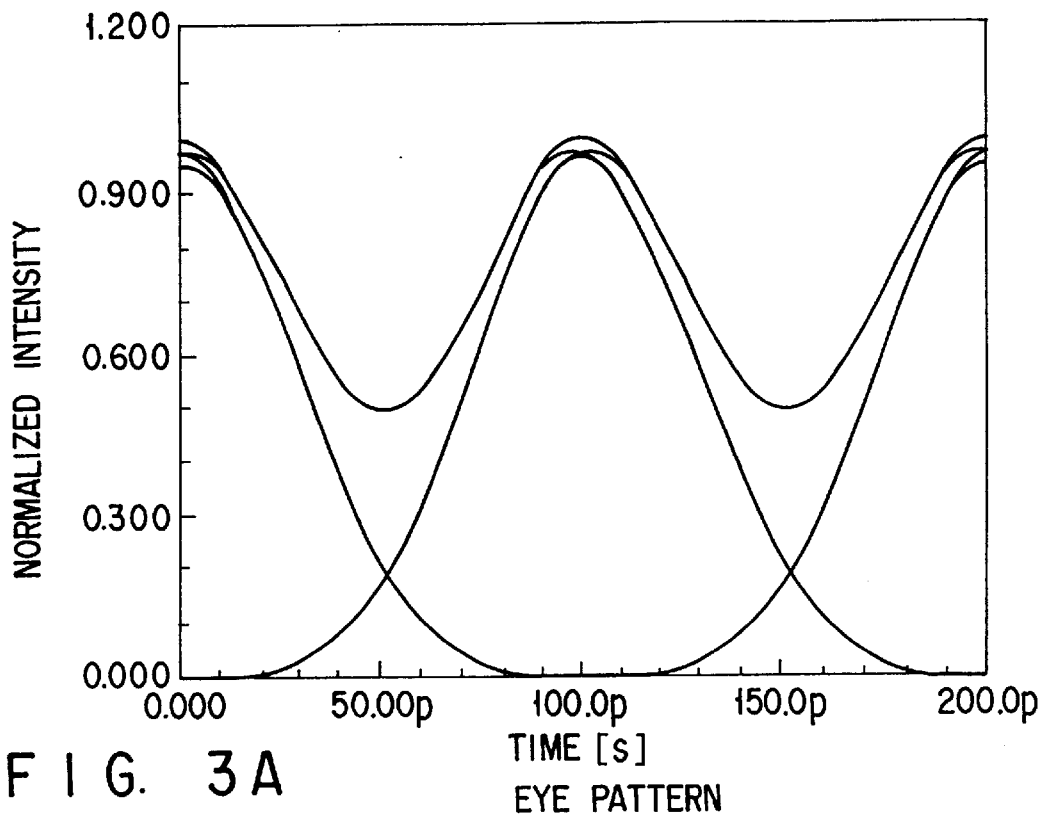
F I G. 3A  EYE PATTERN
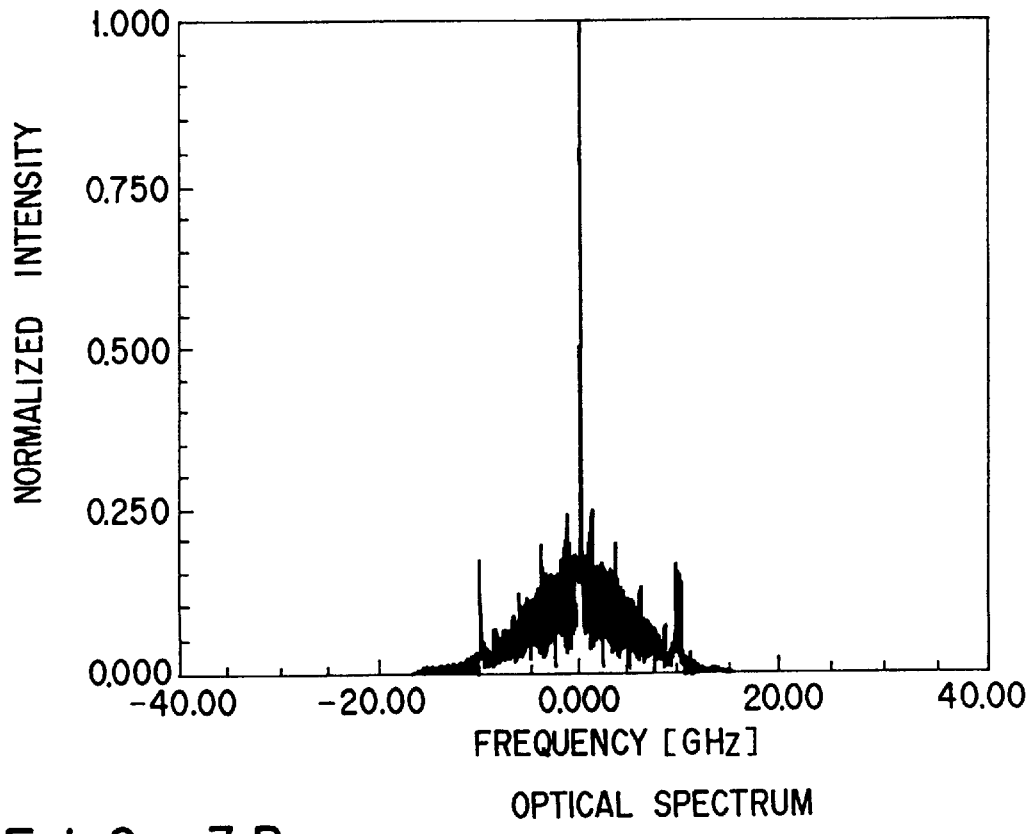
F I G. 3B  OPTICAL SPECTRUM

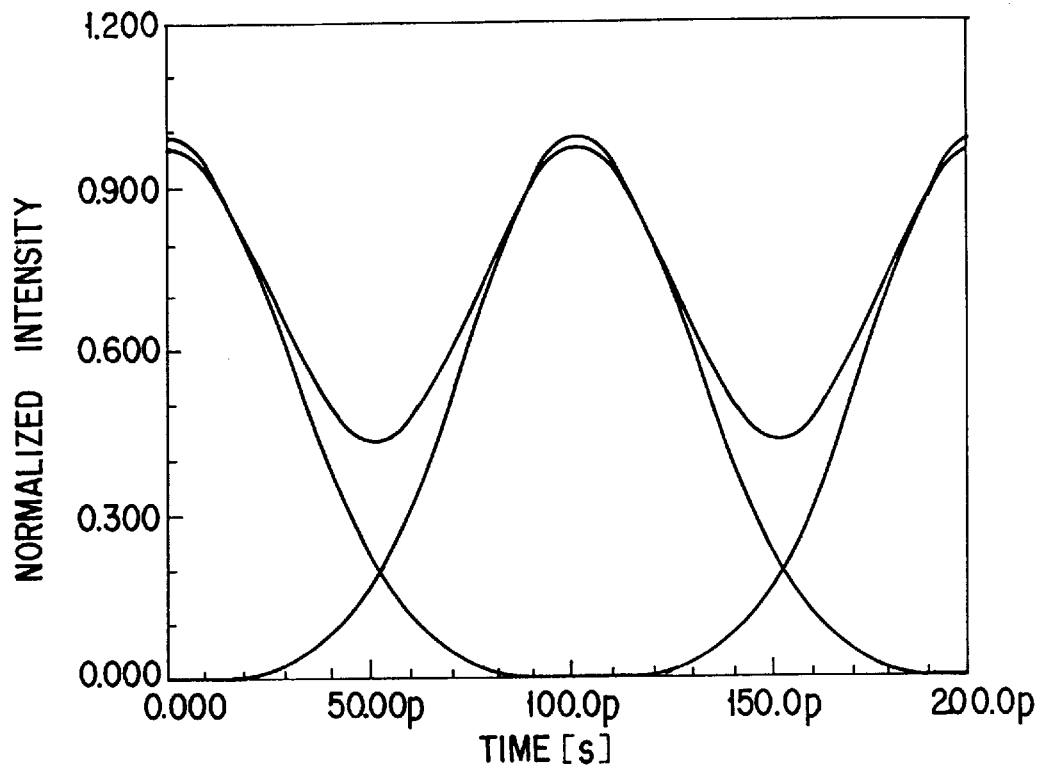
F I G. 4A  EYE PATTERN
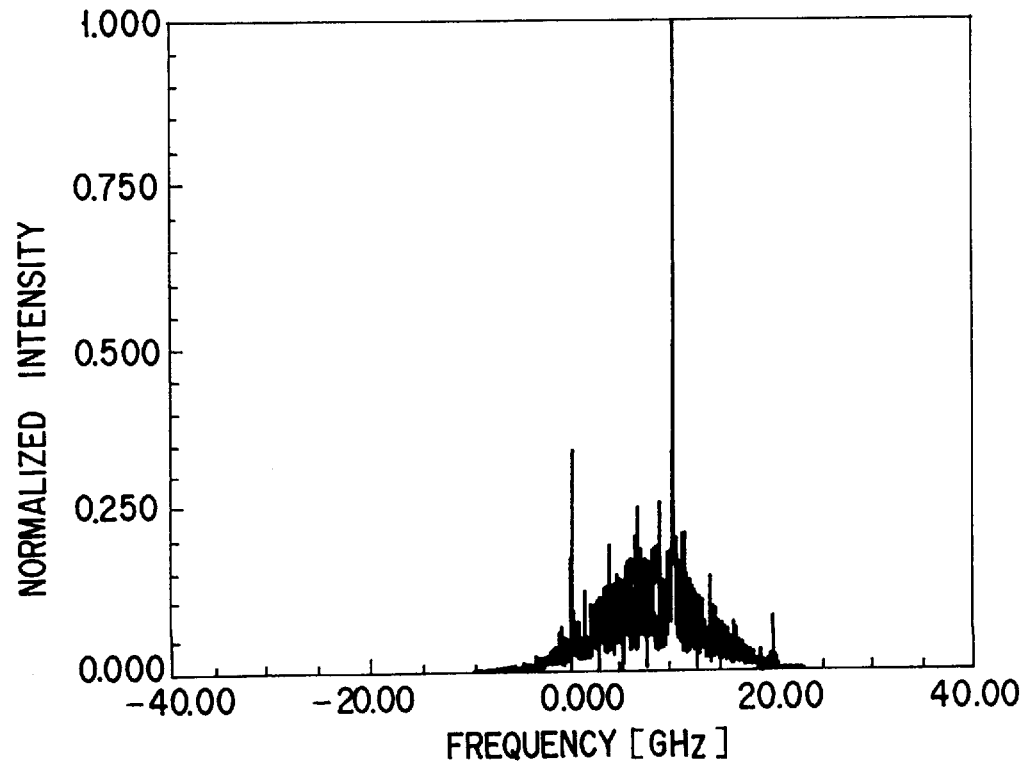
OPTICAL SPECTRUM
F I G. 4B

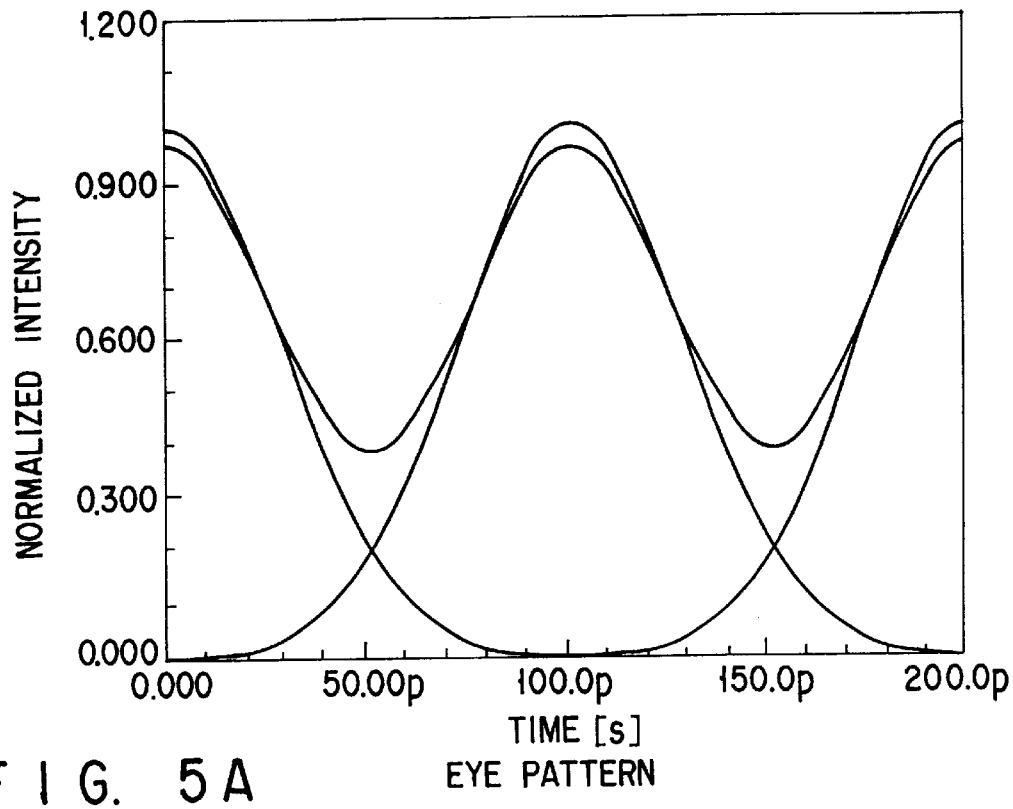
F I G. 5A
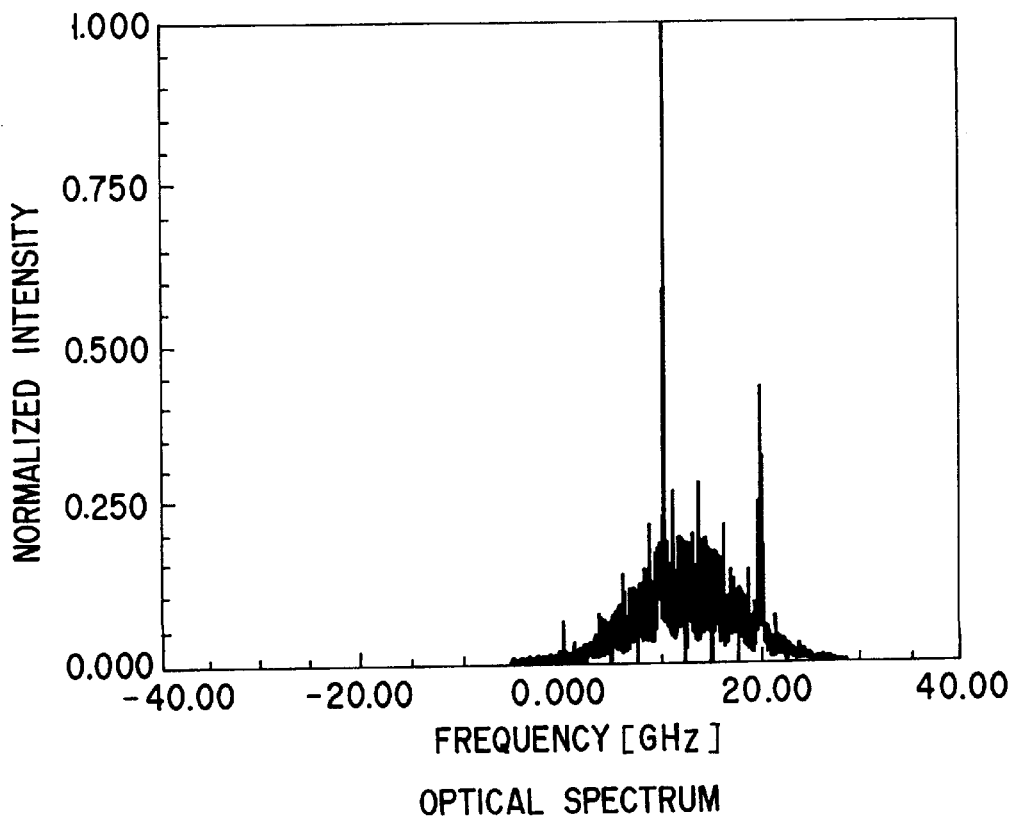
F I G. 5B

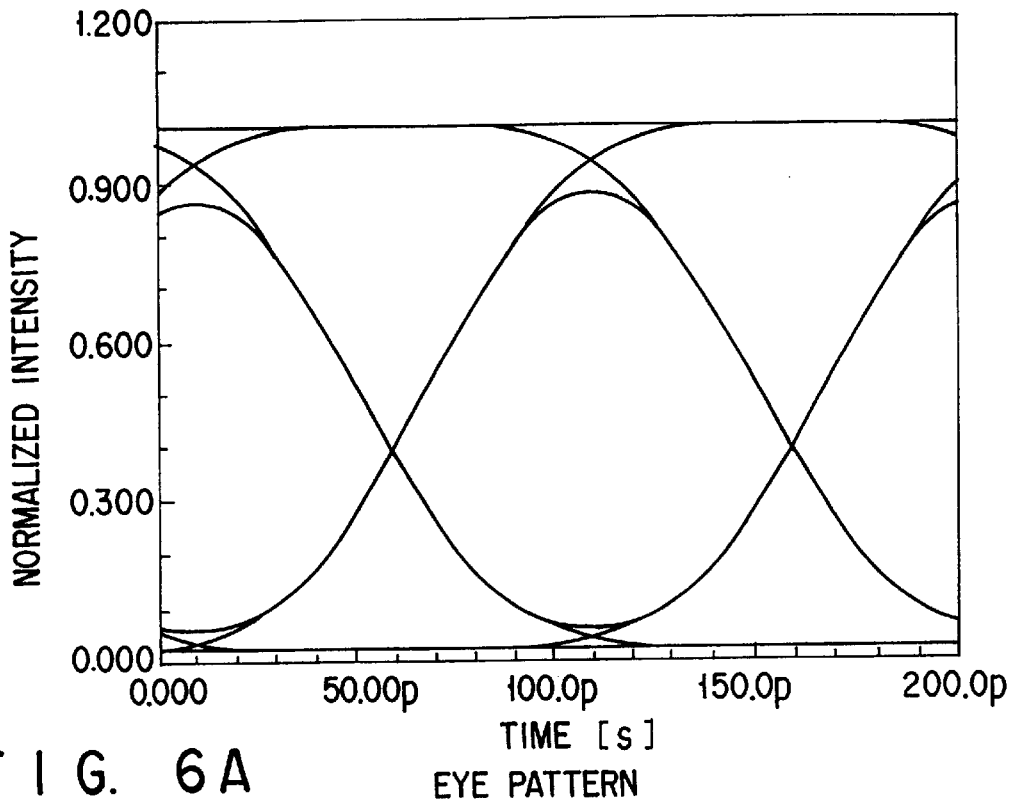
FIG. 6A EYE PATTERN
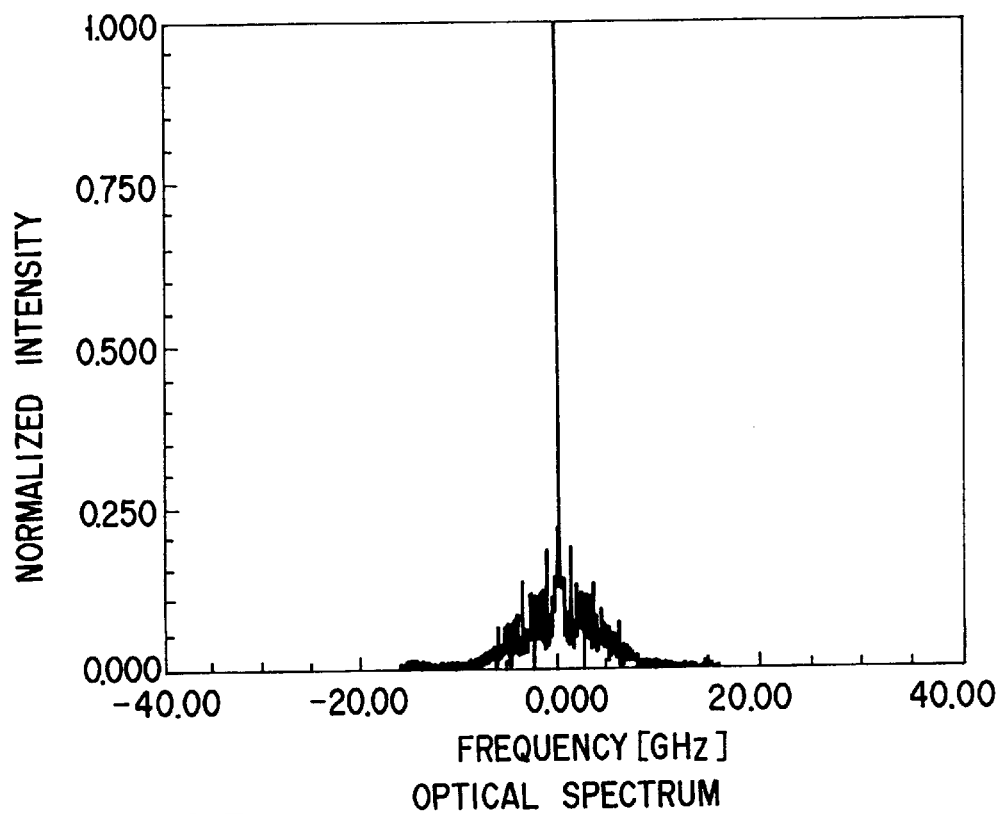
FIG. 6B OPTICAL SPECTRUM

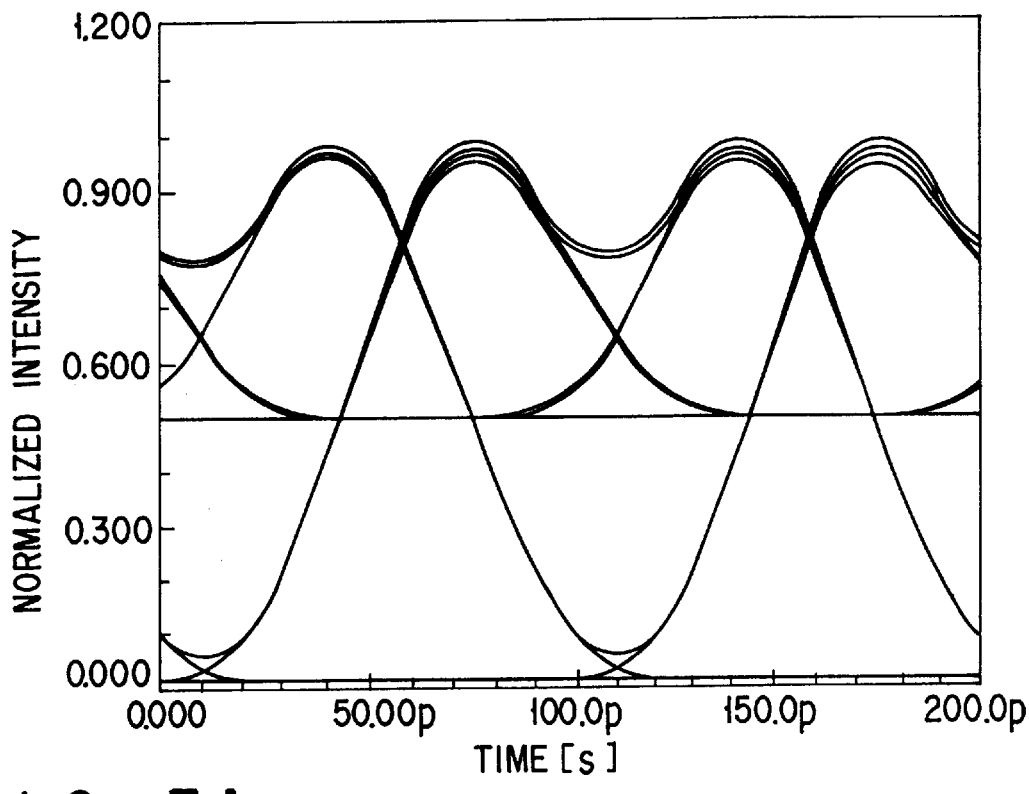
FIG. 7A    EYE PATTERN
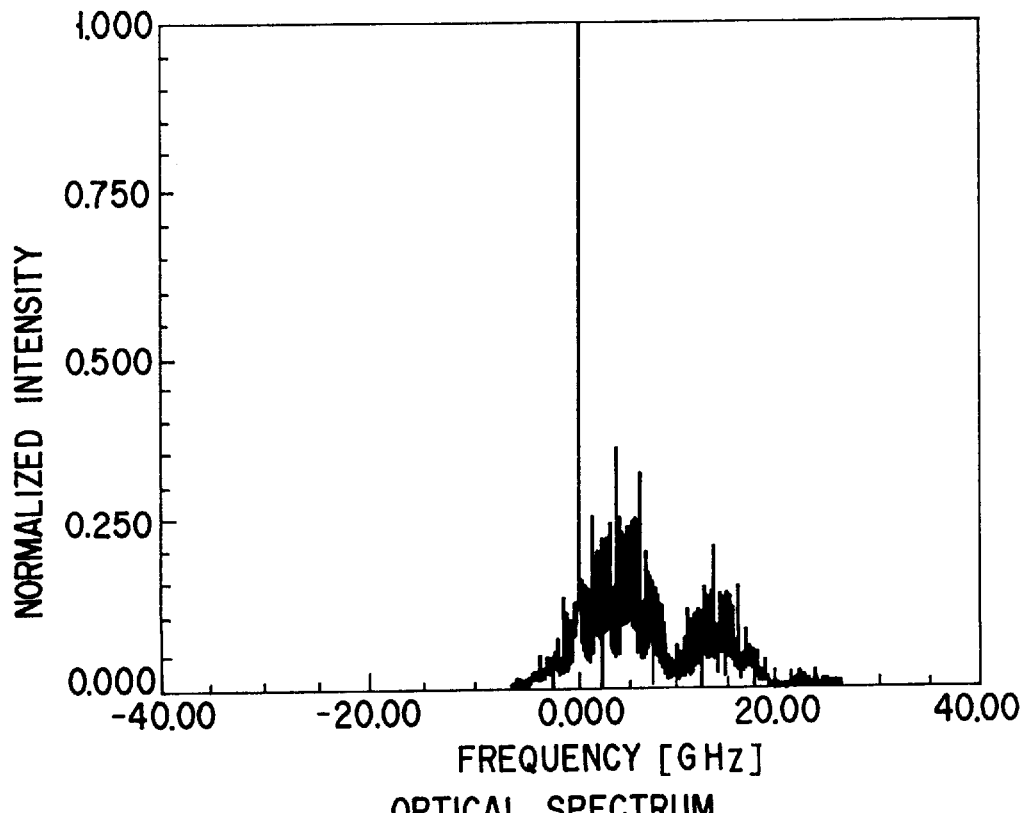
FIG. 7B    OPTICAL SPECTRUM

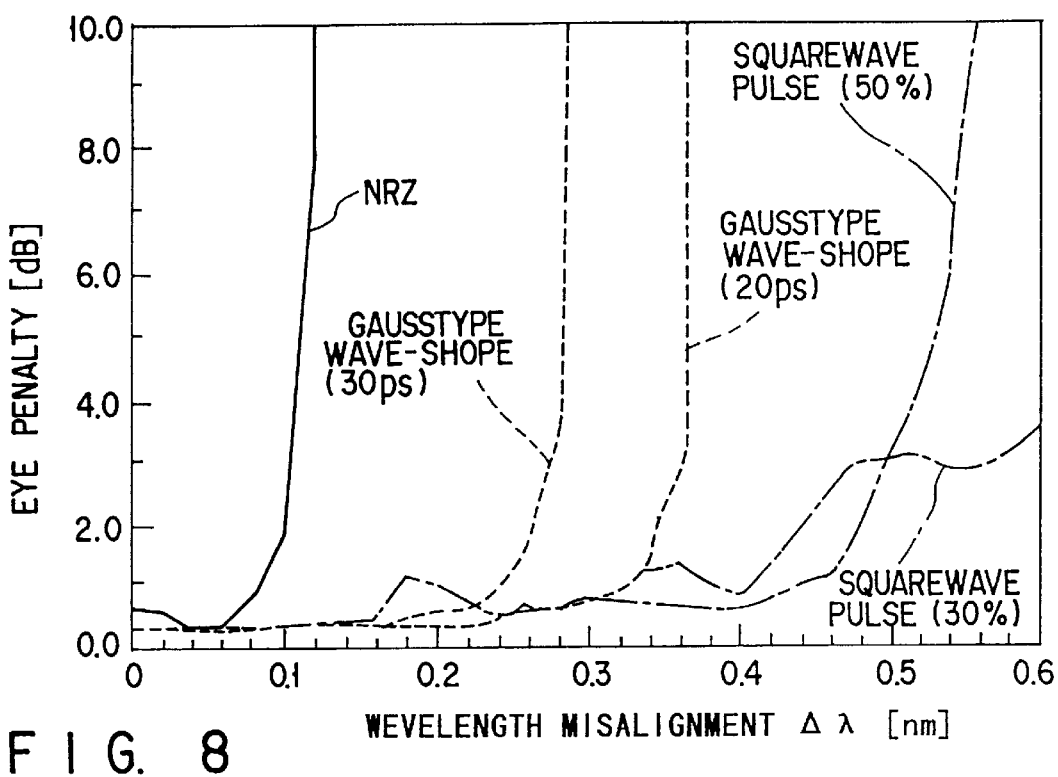
F I G. 8
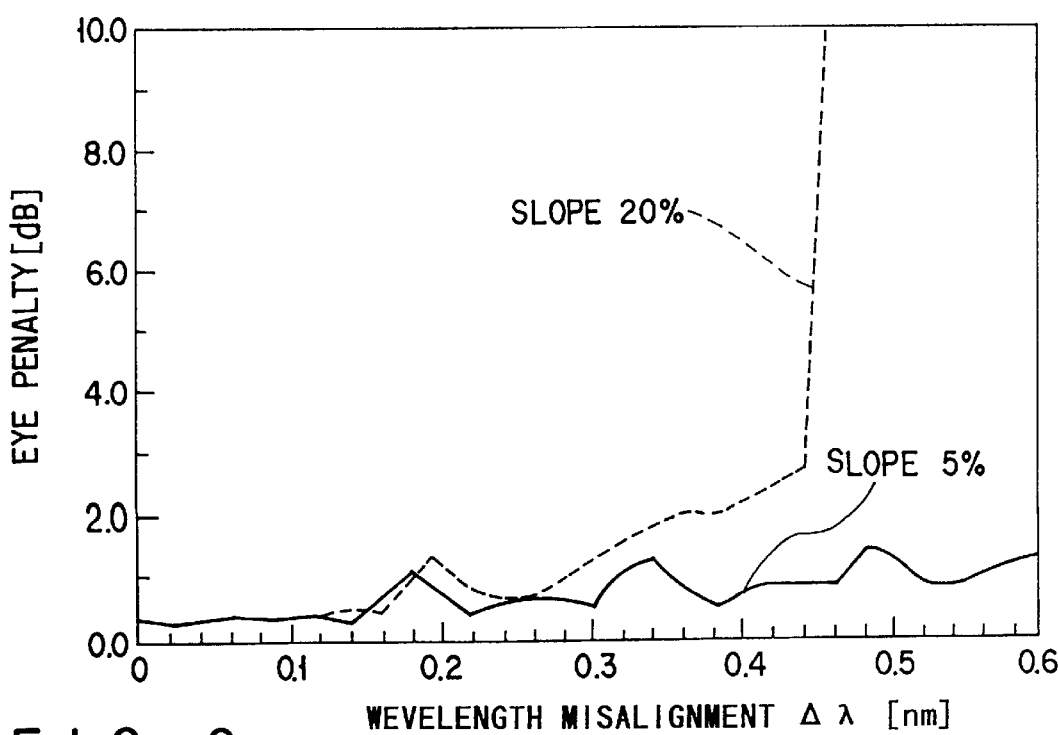
F I G. 9

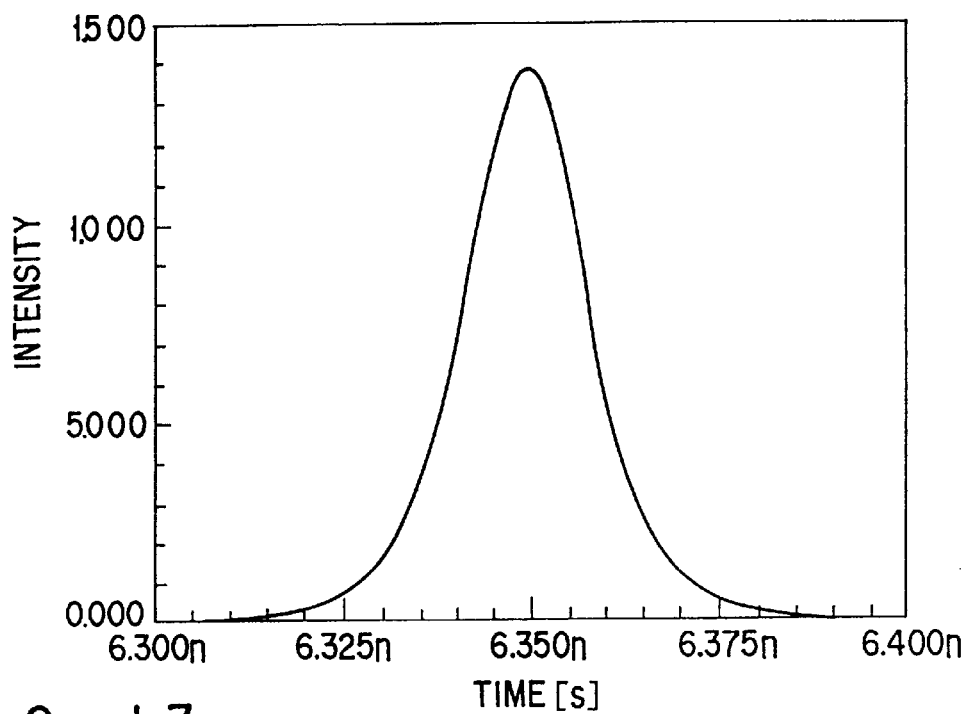
F I G. 13
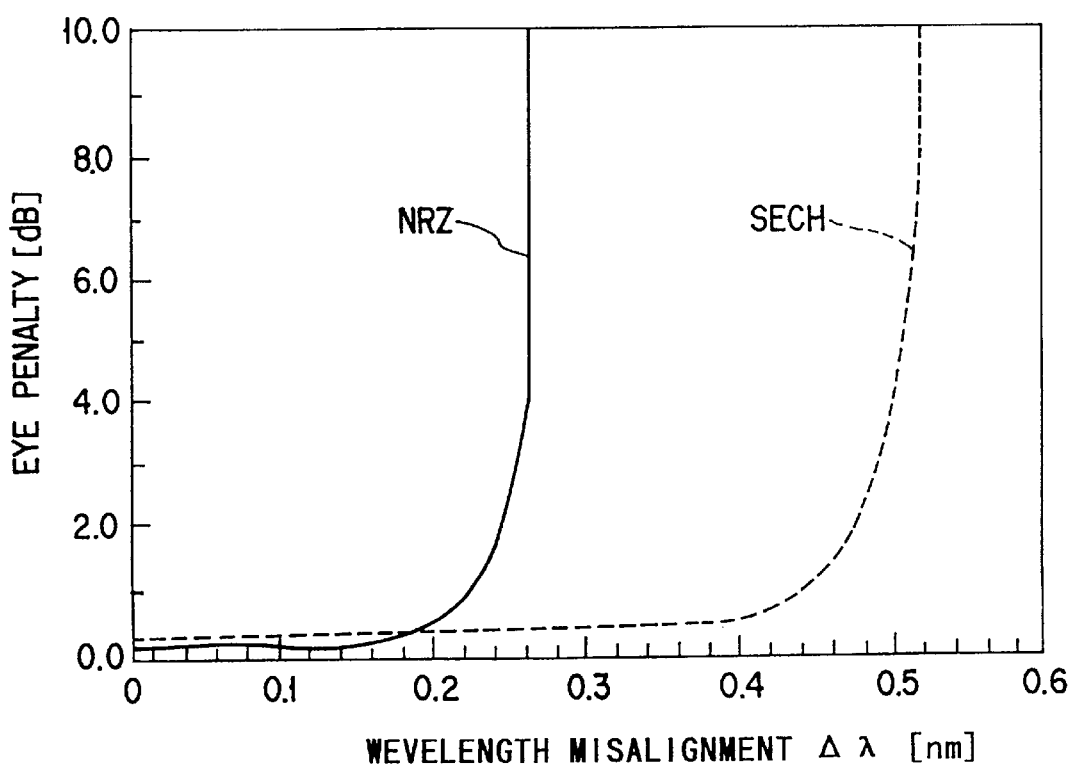
F I G. 14

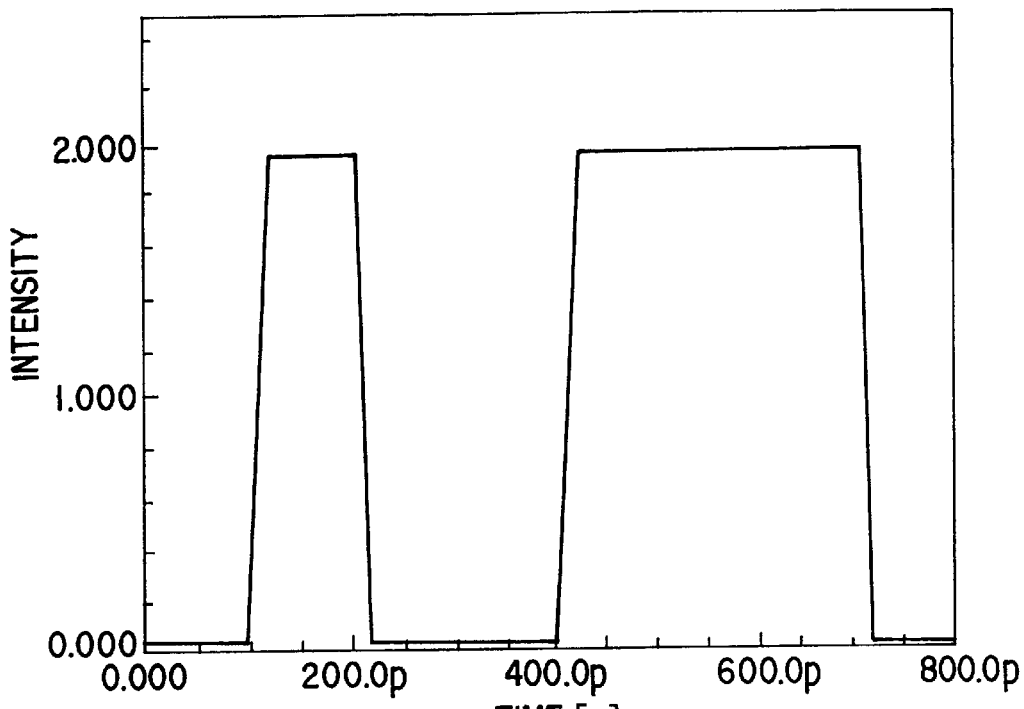
FIG. 15A NRZ SIGNAL
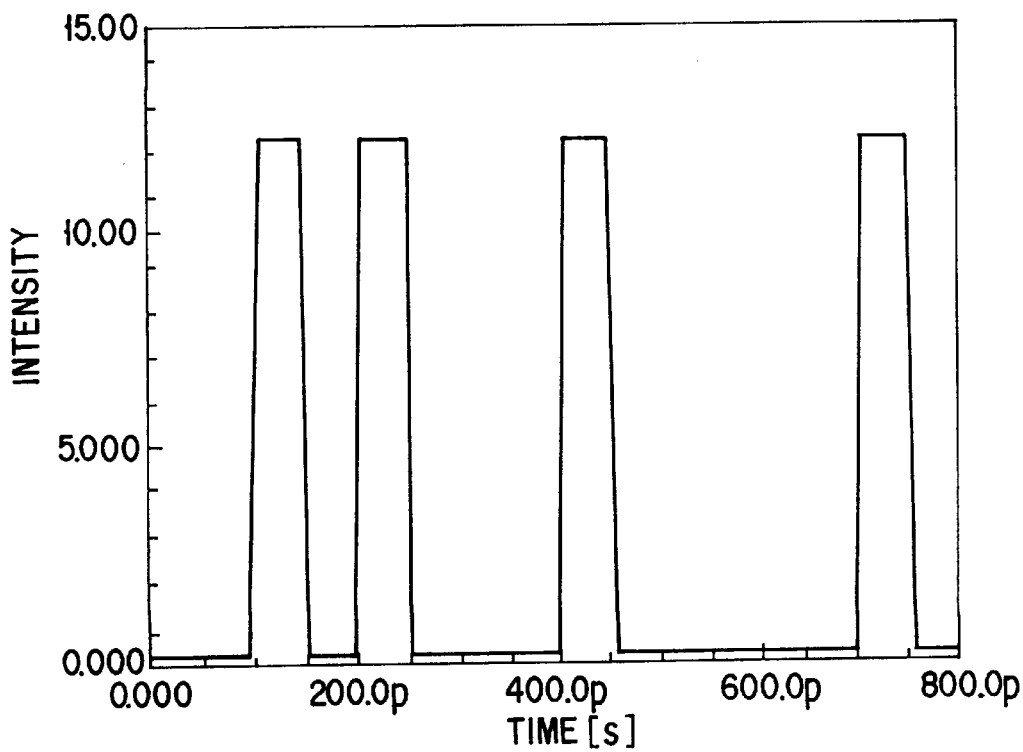
FIG. 15B CODED OPTICAL TRANSMITTING PULSE

OPTICAL TRANSMISSION SYSTEM AND METHOD USING WAVELENGTH DIVISION MULTIPLEX

BACKGROUND OF THE INVENTION

The present invention relates to an optical transmission system and method using wavelength division multiplex.

There is an optical system wherein information is digitized and optically modulated on a transmission side and transmitted through an optical fiber serving as a transmission path, and an optical signal transmitted through the optical fiber is converted to an electric signal and restored to the digital signal on a reception side, thus reproducing the original information. This system is one of communication systems capable of providing a wide band, achieving high-speed transmission, and transmitting large-volume information with high quality. Such an optical transmission system has been researched and developed more and more with development of optical fiber amplifiers, and special attention has been paid to the system as a large-capacity transmission system for a future multimedia information age.

In optical communications, and in an optical fiber has a very wide frequency band, thereby a great number of communication channels can been provided by multiplexing optical signals with different carrier frequencies. This system is called wavelength division multiplex optical transmission. According to the wavelength division multiplex optical transmission, the transmission capacity of the entire system can be increased without increasing the transmission capacity for each channel, by multiplexing a plurality of channels in wavelength regions. In addition, the wide-band and large-capacity of optical fibers can be efficiently utilized in a wavelength division multiplex optical transmission system wherein a node having a function of drop-multiplexing a channel in a transmission path and a function of add-multiplexing a channel in the transmission path is provided in the transmission path.

An ADM node, which is a kind of the above-mentioned node, comprises a demultiplexer for demultiplexing a plurality of channels to a channel in accordance with a given wavelength, a multiplexer for multiplexing, a switch for drop-multiplexing a desire channel in the demultiplexed channels and add-multiplexing a desire channel to the multiplexed channels. As typical example, the multiplexer and demultiplexer include, respectively, input ports or output ports for at least several channels, thereby to multiplex/demultiplex optical signals which are associated with different channels and are obtained by modulating carrier optical signals having different wavelengths for the respective channels. These ports have wavelength dependency and have wavelength/transmittance characteristics as shown in FIG. 2. Specifically, each port has such wavelength/transmittance characteristics that the port transmits only wavelengths in a predetermined range with respect to a central frequency of the wavelength of a channel associated with the port. In addition, the wavelength/transmittance characteristics vary slightly from multiplexer/demultiplexer to multiplexer/demultiplexer. If the number of ADM nodes to be inserted in the transmission path increases, multiplexers/demultiplexers having different inherent wavelength/transmittance characteristics are connected and thus band-limit regions in all channels will increase and transmission bands will narrow. For example, if an M-number of ADM nodes are provided in the transmission path, it is considered that there are an optical transmission terminal multiplexer, a demultiplexer and a multiplexer in each ADM node and an optical reception terminal demultiplexer. In total, an "2M+2" multiplexers/demultiplexers having wavelength/transmittance characteristics are connected. In a case where wavelength/transmittance characteristics of each port of the multiplexer/demultiplexer are of a Gauss type with a half-maximum transmission band width Bf, the half-maximum transmission band width becomes $Bf/(2M+2)^{1/2}$ after passage of signals through the "2M+2" multiplexers/demultiplexers. Thus, the transmission band width greatly decreases in accordance with the number of ADM nodes. This poses a serious problem in an optical transmission system using wavelength division multiplex and NRZ (Non-Return-to-Zero) pulses. Specifically, when digitized data is to be transmitted in the form of optical signals, the digital data is converted to pulse signals and, with use of the pulse signals, a continuous carrier light of a predetermined wavelength is modulated. In this case, NRZ pulses are conventionally used as the pulse signals. The reason is that NRZ pulses have a less increase in optical spectrum band and are suitable for high-density wavelength division multiplex.

However, when an NRZ-pulse optical signal passes through a device having a narrow-band wavelength/transmittance characteristics, if the carrier wavelength of the optical signal has a misalignment in wavelength relative to the transmission central wavelength of the device, the optical spectrum becomes asymmetric and a large optical waveform distortion occurs.

Under the circumstances, in an optical transmission system using wavelength division multiplex and NRZ-pulse optical signals and also having ADM nodes in a transmission passage, the transmission band is narrowed by the multiplexer/demultiplexer. Consequently, a large optical waveform distortion occurs due to a misalignment between the wavelength of a light source and the transmission central wavelength of the multiplexer/demultiplexer.

As has been described above, in the conventional optical transmission system using wavelength division multiplex and NRZ-pulse optical signals suitable for high-density wavelength division multiplex, if ADM nodes are provided in the transmission path, the optical spectrum of the transmitted optical signal becomes asymmetric due to the misalignment between the wavelength of the light source on the optical transmitter side and the transmission central wavelength in the multiplexer/demultiplexer.

It is considered that the optical waveform distortion increases due to such an asymmetric spectrum. In order to maintain high communication quality and prevent failure of communication, it is necessary, therefore, to make the wavelength of the light source coincide with the transmission central wavelength of each multiplexer/demultiplexer. In order words, strict conditions must be satisfied for stability of wavelength/transmittance characteristics of the light source and multiplexer/demultiplexer.

The conditions for stability of wavelength become stricter as the number of ADM nodes inserted in the transmission path increases. Thus, the number of ADM nodes to be inserted is limited in accordance with the degree of wavelength stability required in the communication system. However, it is technically difficult to make the wavelength of the light source for all channels coincide stably with the transmission central wavelength of the multiplexer/demultiplexer and to maintain the state of coincidence, in consideration of the wavelength of the light source, a fluctuation in wavelength transmission characteristics of the multiplexer/demultiplexer due to ambient temperatures, degradation with passing of time of the light source and multiplexer/demultiplexer, etc.

Taking into account the development of information-oriented societies as well as development and wider use of information-related devices, there will be an increasing demand for communication systems having a great number of ADM nodes in a transmission path, which ADM nodes have functions of adding (or branching) and dropping (or inserting) channels. Under the circumstances, there is a demand for development of techniques which will make it possible to increase the number of ADM nodes, with less degradation due to temperatures or passage of time. Besides, even in a case where there is no ADM node in the transmission path, the optical waveform deteriorates if a wavelength misalignment occurs between the wavelength of the light source and the transmission central wavelength of an optical filter with a narrow transmission band, which is provided in the transmission path, or on the optical transmission terminal side or optical reception terminal side. In particular, in a demultiplexer which is widely used for high-density wavelength division multiplex, a plurality of channels are densely arranged in a wavelength region. Thus, the transmission band for each channel is not sufficiently broader than the band of the optical signal. Moreover, it is very difficult from a technical aspect to make the wavelength of the light source coincide with the transmission central wavelength of the optical filter including the multiplexer/demultiplexer for all channels.

A first object of the present invention is to provide an optical transmission system using wavelength division multiplex, which can reduce an optical waveform distortion due to a wavelength misalignment between the wavelength of a light source and the transmission central wavelength of a multiplexer/demultiplexer, relax the conditions for stability of wavelength transmission characteristics for the light source and multiplexer/demultiplexer, and increase the number of ADM nodes which can be inserted in the transmission path, thereby enhancing reliability and stability.

A second object of the present invention is to provide an optical transmission system using wavelength division multiplex, which can reduce an optical waveform distortion due to a wavelength misalignment between the wavelength of a light source and the transmission central wavelength of an optical filter in a transmission path, and relax the conditions for stability of wavelength transmission characteristics for the light source and optical filter, thereby enhancing reliability and stability.

BRIEF SUMMARY OF THE INVENTION

As described above, in the prior art, digital data of transmission information is converted to NRZ pulses, and a carrier optical signal having a wavelength of an associated channel is modulated by using the NRZ pulses. By contrast, in the present invention, the carrier optical signal having a wavelength of an associated channel is modulated by using optical pulses, such as RZ pulses, having pulse waveforms with an equal full-width at half-maximum.

As compared to the RZ pulse, the NRZ pulse has a dense optical spectrum distribution from the carrier wavelength to the wavelength of the maximum modulation frequency. Consequently, an asymmetric optical spectrum distribution near the carrier wavelength due to the wavelength misalignment between the wavelength of the light source and the transmission central wavelength of the multiplexer/demultiplexer will result in an optical waveform distortion. There are NRZ pulses of various widths, depending on the length of continuous "1" data in the signal sequence. Accordingly, signal components are uniformly distributed from a low region to a high region in the optical spectrum. If the balance of distribution between the low region and high region of the optical spectrum is lost, the pattern effect occurs conspicuously and the optical waveform distortion increases.

On the other hand, in the optical transmission system using the wavelength division multiplex according to the present invention, the optical pulses, such as RZ pulses, having pulse waveforms with an equal full-width at half-maximum, are substituted for the NRZ pulses. The optical pulses, such as RZ pulses, having pulse waveforms with an equal full-width at half-maximum, have the same shape, irrespective of the state of succession of "1" in the signal sequence. Although the RZ pulse has a broader optical spectrum distribution than the NRZ pulse, the optical spectrum concentrates at the carrier wavelength and the wavelength of the maximum modulation frequency. The optical pulses, such as RZ pulses, having pulse waveforms with an equal full-width at half-maximum, have a broad spectrum distribution, as mentioned above. Thus, even if a wavelength misalignment occurs between the wavelength of the light source and the transmission central wavelength of the multiplexer/demultiplexer and the optical spectrum distribution becomes asymmetrical, an optical waveform distortion does not occur so conspicuously as in the case of NRZ pulse, unless the spectrum concentration at the carrier wavelength and the wavelength of the maximum modulation frequency is considerably reduced. Since all RZ pulses have the same pulse shape, a pattern effect due to the signal sequence does not appear conspicuously. Merely the pulse width increases due to the limitation of the band. No great waveform distortion occurs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1 schematically shows the structure of a system according to a first embodiment of the present invention;

FIG. 2 shows wavelength/transmittance characteristics of a multiplexer/demultiplexer;

FIGS. 3A and 3B show an eye pattern and an optical spectrum distribution when a wavelength misalignment in an RZ pulse used in the first embodiment is 0.0 nm;

FIGS. 4A and 4B show an eye pattern and an optical spectrum distribution when a wavelength misalignment in the RZ pulse used in the first embodiment is 0.1 nm;

FIGS. 5A and 5B show an eye pattern and an optical spectrum distribution when a wavelength misalignment in the RZ pulse used in the first embodiment is 0.16 nm;

FIGS. 6A and 6B show an eye pattern and an optical spectrum distribution when a wavelength misalignment in an NRZ pulse used in a conventional system is 0.0 nm;

FIGS. 7A and 7B are views for a comparative description of the present invention and show an eye pattern and an optical spectrum distribution when a wavelength misalignment in the NRZ pulse used in the conventional system is 0.1 nm;

FIG. 8 illustrates eye penalty characteristics in relation to a wavelength misalignment when an RZ pulse and an NRZ pulse are used in first and second embodiments of the present invention;

FIG. 9 illustrates eye penalty characteristics in relation to a wavelength misalignment when rectangular pulses with different slope times are used in the second embodiment of the invention;

FIG. 13 shows an example of a hyperbolic secant type RZ pulse used in a fourth embodiment of the invention;

FIG. 14 shows an example of eye penalty characteristics in relation to a wavelength misalignment in the hyperbolic secant type RZ pulse used in the fourth embodiment of the invention, and in an NRZ pulse;

FIGS. 15A and 15B show examples of transmission optical pulses encoded in a fifth embodiment of the invention;

Figure 10:
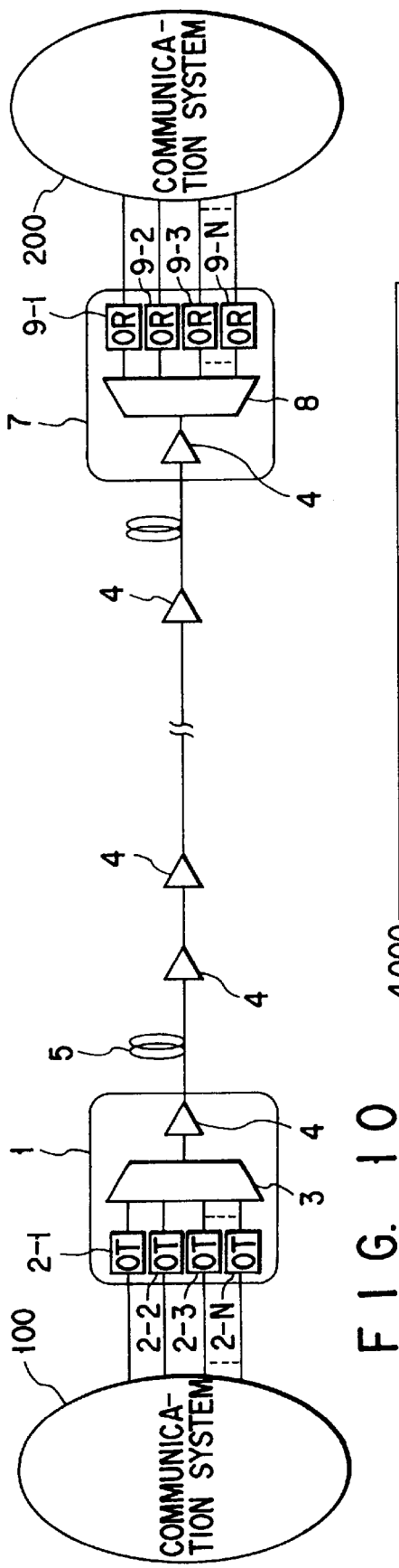
FIG. 10 schematically shows the structure of a system according to a third embodiment of the invention.

DETAILED DESCRIPTION OF THE INVENTION (First Embodiment)

A first embodiment of the present invention aims at reducing an optical wavelength distortion due to a wavelength misalignment between the wavelength of a light source and the transmission central wavelength of a multiplexer/demultiplexer. This embodiment relates to an optical transmission system using wavelength division multiplex. In this system, conventionally used NRZ (Non-Return-to-Zero) pulses are replaced with optical pulses, such as RZ (Return-to-Zero) pulses, having pulse waveforms with an equal full-width at half-maximum (FWHM). The optical pulses having pulse waveforms with an equal FWHM such as the RZ pulses have a greater allowance for a wavelength lag, than the NRZ pulses. Accordingly, the conditions for stability of wavelength transmission characteristics of a light source and a multiplexer/demultiplexer can greatly be relaxed. Making use of this feature, the above-mentioned problem of optical waveform distortion is solved.

The optical transmission system according to the first embodiment, as shown in FIG. 1, includes an optical transmission terminal station 1 connected to a communication system 100, an optical fiber 5, ADM nodes 6-1 to 6-M, and an optical reception terminal station 7 connected to a communication system 200. The optical transmission terminal station 1, which is transmission station equipment, comprises optical transmitters 2-1 to 2-N, a multiplexer 3, and an erbium-doped optical fiber amplifier 4.

The optical transmitters 2-1 to 2-N associated with respective channels convert information from the communication system 100 to optical signals having waveforms of RZ pulses, which are typical examples of optical pulses having pulse waveforms with the equal FWHM. The optical transmitters 2-1 to 2-N associated with respective channels modulate carrier light, which is emitted from a continuous light (CW light) emission light source built in each optical transmitter and has a different wavelength according to the associated channel, by using the optical signals with RZ pulse waveforms, and output modulated transmission optical signals. The multiplexer 3 multiplexes (superimposes) carrier optical signals from the optical transmitters 2-1 to 2-N and outputs the multiplexed optical signal. The erbium-doped optical fiber amplifier 4 amplifies the multiplexed optical signal (wavelength multiplexed optical signal) output from the multiplexer 3 and outputs the amplified signal to the optical fiber 5.

The optical fiber 5 is a transmission path for optical signals and extends between the optical transmission terminal station 1 and optical reception of. terminal station 7.

The ADM nodes 6-1 to 6-M are relay stations with channel branching/inserting functions, which are provided, as required, at intervening positions on the transmission path of the optical fiber 5. Each of the ADM nodes 6-1 to 6-M comprises erbium-doped optical fiber amplifiers 4, a demultiplexer 8 for demultiplexing the waveform multiplexed optical signal, a cross-connector 10 and a multiplexer 3. The erbium-doped optical fiber amplifiers 4 amplify and output the input optical signal. Each of the ADM nodes 6-1 to 6-M has the optical fiber amplifier 4 for the input stage and the optical fiber amplifier 4 for the output stage. The optical fiber amplifier 4 for the input stage is provided at the first stage of each ADM node, 6-1 to 6-M, and the optical fiber amplifier 4 for the output stage is provided at the final stage thereof. The demultiplexer 8 demultiplexes the optical signal (carrier optical signal) output from the input-stage erbium-doped optical fiber amplifier 4 to optical signals for the respective channels. The cross-connect 10 is a change-over switch having functions of branching, inserting and changing optical signals. The optical signals (channels), which are not branched in the ADM node, pass through the cross-connect 10 to the multiplexer 3. The multiplexer 3 multiplexes the optical signals (carrier optical signals) which have been branched, inserted or changed over and output from the cross-connector 10, and outputs the multiplexed optical signal. The output-stage erbium-doped optical fiber amplifier 4 amplifies the optical signal multiplexed by the multiplexer 3 and outputs the amplified optical signal.

The optical reception terminal station 7 is a terminal receiving station and comprises an erbium-doped optical fiber amplifier 4, a demultiplexer 8, and optical receivers 9-1 to 9-N associated with the respective channels. The optical fiber amplifier 4 amplifies the optical signal transmitted through the optical fiber 5 serving as the transmission path. The demultiplexer 8 demultiplexes the amplified optical signal into carrier optical signals. The optical receivers 9-1 to 9-N are provided for respective channels and receives the carrier optical signals of the associated channels, which have been demultiplexed by the demultiplexer 8. The optical receivers 9-1 to 9-N demodulate the input optical signals to information signals.

Each optical multiplexer 3 has input ports associated with the respective channels. Each optical multiplexer 3 multiplexes the optical signals input to the input ports and outputs the multiplexed signal as a wavelength multiplexed optical signal. Each demultiplexer 8 has output ports associated with the respective channels. Each demultiplexer 8 demultiplexes the wavelength multiplexed optical signal input to the input terminal thereof into signals with different carrier wavelengths, and outputs the demultiplexed signals from the output ports of the associated channels.

In the optical transmission terminal station 1 of the present system, transmission information to be transmitted through associated channels is converted to optical signals S-1 to S-N with RZ-pulse waveforms by the optical transmitters 2-1 to 2-N of the respective channels. The converted optical signals with RZ-pulse waveforms are transmitted by means of carrier optical waves having different wavelengths for the respective channels. For example, the optical transmission signal is obtained in the following manner. A continuous laser beam is generated from the light source, and the laser beam is intensely modulated by the optical signal of transmission information which is pulse-coded in the RZ (Return-to-Zero) pulse shape.

The optical transmission signals for the respective channels (optical signals S-1 to S-N of the respective channels) are wavelength-multiplexed by the multiplexer 3 in the optical transmission terminal station 1. The multiplexed signal is amplified by the erbium-doped optical fiber amplifier 4 in the optical transmission terminal station 1, and the amplified signal is transmitted to the ADM nodes 6-A to 6-M and optical reception terminal station 7 through the optical fiber 5 serving as the transmission path.

In the optical reception terminal station 7, the transmitted wavelength-multiplexed optical signal is amplified by the optical fiber amplifier 4 and demultiplexed by the demultiplexer 8 into optical signals of individual wavelengths for the respective channels. These optical signals are received by the associated optical receivers 9-1 to 9-N and demodulated into information signals.

Each of the ADM nodes 6-1 to 6-M provided midway along the optical fiber 5 or transmission path comprises optical fiber amplifiers 4 inserted on the input side and output side for the purpose of, in particular, optical loss compensation; a demultiplexer 8 for demultiplexing the wavelength-multiplexed optical signal into optical signals with different wavelengths for the respective channels; a cross-connector 10 having functions of branching, inserting and changing the optical signals; and a multiplexer 3 for multiplexing the optical signals with different wavelengths of the respective channels.

In the present system, the multiplexer/demultiplexer (multiplexer 3, demultiplexer 8) may comprise an array waveguide and a diffraction grating, or an array waveguide grating, since these elements have simple structures and can treat optical signals of various wavelengths.

The ADM node is designed to have the functions of branching and inserting channels. Normally, in order to perform the branching and inserting of channels, the multiplexer and demultiplexer are inserted, as a pair, in the ADM node. However, it is possible to demultiplex an optical signal into optical signals for respective channels by means of a multiplexer/demultiplexer, and to multiplex the demultiplexed optical signals by means of the same multiplexer/demultiplexer. In this case, it should suffice to insert only one multiplexer/demultiplexer in the ADM node. If this ADM node is adopted, the manufacturing cost and the size of the system can be reduced.

As has been stated above, various multiplexers/demultiplexers are available for various uses. In general, the wavelength/transmittance characteristics of ports of multiplexers/demultiplexers are of Gauss type. Accordingly, the wavelength/transmittance characteristics of multiplexers/demultiplexers (multiplexer 3 and demultiplexer 8) have wavelength/transmittance loss characteristics, as shown in FIG. 2.

The optical waveform distortion due to the wavelength misalignment between the wavelength of the light source and the transmission central wavelength of the multiplexer/demultiplexer in the optical transmission system using the wavelength division multiplex will now be shown by numerical calculations. In the present embodiment, suppose that the transmission speed of each channel is 10 Gb/s (gigabit/sec.), nine ADM nodes are inserted in the transmission path, and the full-width at half maximum (FWHM) of each port of the multiplexer/demultiplexer is 0.4 nm.

In this description, crosstalk from adjacent channels and dispersive/non-linear effect of optical fiber 5 or transmission path are ignored in order to show the influence of distortion upon the optical waveform due to the wavelength misalignment between the wavelength of the light source of the optical transmitter and the transmission central wavelength of the multiplexer/demultiplexer.

The noise factor of natural emission optical noise in the optical fiber amplifier 4 is 6 dB, the optical receiver subjects the received optical signal to ideal square-law detection, and the detected optical signal is passed through an equivalent filter of 3 dB cut-off frequency 7.5 GHz.

In order to consider a worst case of the wavelength misalignment between the wavelength of the light source and the transmission central wavelength of the multiplexer/demultiplexer, it is supposed that the multiplexers/demultiplexers have an equal transmission central wavelength $\lambda$ADM, and a wavelength $\lambda$LD is shifted from the transmission central wavelength $\lambda$ADM.

FIGS. 3A and 3B show an eye pattern and an optical spectrum when an RZ pulse is received, in the case where a wavelength misalignment of the optical transmitter light source relative to the transmission central wavelength $\lambda$ADM is expressed by $\Delta\lambda$ ($\Delta\lambda=\lambda$ADM$-\lambda$LD) and the wavelength misalignment $\Delta\lambda$ is 0.0 nm. FIGS. 4A and 4B show an eye pattern and an optical spectrum when an RZ pulse is received, in the case where the wavelength misalignment $\Delta\lambda$ is 0.1 nm. FIGS. 5A and 5B show an eye pattern and an optical spectrum when an RZ pulse is received, in the case where the wavelength misalignment $\Delta\lambda$ is 0.16 nm. The RZ pulses are of Gauss type and each have a full-width at half-maximum is 30 picoseconds (ps).

For the purpose of comparison, FIGS. 6A and 6B show an eye pattern and an optical spectrum when an NRZ pulse is received, in the case where the wavelength misalignment $\Delta\lambda=\lambda$ADM$-\lambda$LD is 0.0 nm, and FIGS. 7A and 7B show an eye pattern and an optical spectrum when an NRZ pulse is received, in the case where the wavelength misalignment $\Delta\lambda$ is 0.1 nm.

In the case of the NRZ pulse, when $\Delta\lambda=0.0$ nm (i.e. no wavelength lag), the eye pattern shown in FIG. 6A is broadly open, and the optical spectrum shown in FIG. 6B is distributed in a range of about ±8 GHz with respect to the central frequency. In addition, an intensity level is very low, except at a central frequency. When $\Delta\lambda=0.1$ nm, the eye pattern shown in FIG. 7A is greatly narrowed, and the optical spectrum shown in FIG. 7B is distributed in a range of about 6 GHz on the "−" side with respect to the central frequency and in a range of about 26 GHz on the "+" side with respect to the central frequency. In addition, an intensity level is very low, except at a central frequency.

It is understood from FIGS. 6A and 6B that in the case of the NRZ pulse, even when $\Delta\lambda=0.0$ nm (i.e. no wavelength lag), a signal component of a high region is cut off by the narrowing of the transmission band because of the nine ADM nodes inserted in the transmission path, and thus the pattern effect occurs.

It is understood from FIGS. 7A and 7B that when $\Delta\lambda=0.1$ nm, a large optical waveform distortion occurs due to the asymmetry of optical spectrum distribution and pattern effect, and a serious problem arises. Although not shown, in the case of the NRZ pulse, when $\Delta\lambda=0.1$ nm, it was observed that the eye was completely closed and there was no feasibility.

On the other hand, in the case of the RZ pulse, when $\Delta\lambda=0.0$ nm (i.e. no wavelength lag), the eye pattern shown in FIG. 3A is broadly open, and the optical spectrum shown in FIG. 3B is symmetrically distributed in a range of about +14 GHz with respect to the central frequency. In addition, an intensity level is very low, except at a central frequency.

When $\Delta\lambda=0.1$ nm, the eye pattern shown in FIG. 4A is broadly opened, and the optical spectrum shown in FIG. 4B is shifted in a range of about 6 GHz on the "−" side with respect to the central frequency and in a range of about 22 GHz on the "+" side with respect to the central frequency. However, a fine symmetric distribution is unchanged. In addition, an intensity level is maximum at +10 GHz and is low at other points.

When $\Delta\lambda=0.16$ nm, the eye pattern shown in FIG. 5A is still broadly opened. The optical spectrum as shown in FIG. 5B is shifted almost completely to the "+" side. However, the optical spectrum, as a whole, has a distribution which is reversed from that obtained in the case of $\Delta\lambda=0.1$ nm, and a fine symmetric distribution is still obtained. An intensity level is maximum at +10 GHz and is low at other points.

Specifically, in the case of the RZ pulse, as shown in FIGS. 3A and 3B, even when $\Delta\lambda=0.0$ nm (i.e. no wavelength lag), a signal component of a high region is cut off, like the NRZ pulse, because the transmission band is narrow, and the pulse width increases. However, the pattern effect hardly occurs, and the eye opens broadly. It is understood from this that when the RZ pulse, as compared with the NRZ pulse, is adopted, signals of a narrower transmission band can be transmitted and that a greater number of ADM nodes can be inserted in the transmission path.

In the case of the RZ pulse, as is shown in FIGS. 4A, 4B, 5A and 5B, even when $\Delta\lambda=0.1$ nm and $\Delta\lambda=0.16$ nm, the eye pattern opens broadly. It is understood that the influence of the wavelength misalignment upon the optical waveform distortion is very small, as compared to the case of the NRZ pulse.

The signal intensity P of the peak in the optical transmission terminal station and erbium-doped optical fiber amplifier satisfies the condition of P<Ps.

In this case, $Ps=(0.776\lambda^3 \text{Aeff D})/(\pi^2 n_2 c t o^2)$, wherein $\lambda$ is the wavelength, Aeff is the effective core are of the optical fiber of the optical transmission path, D is the chromatic dispersive value of the optical fiber, $n_2$ is the non-linear refractive index of the optical fiber, c is the velocity of light, and to is the full-width at half-maximum of the optical pulse.

It follows from this that the RZ pulse, as compared to the NRZ pulse, has a greater allowance for the wavelength misalignment and thus the conditions for stability of wavelength transmission characteristics of the light source and multiplexer/demultiplexer can be greatly relaxed.

As has been described above, the optical transmission system using the wavelength division multiples according to the first embodiment comprises an optical transmission terminal station, an optical transmission terminal station and at least one ADM mode. The optical transmission terminal station is connected to the optical reception terminal station over an optical transmission path. In the optical transmission terminal station, transmission information for each channel is converted to a pulse signal. With use of the pulse signal representing the transmission information for each channel, a carrier optical signal generated from a light source and having a specific wavelength for each channel is modulated and multiplexed. The transmission terminal station outputs the obtained wavelength multiplexed optical signal. The optical reception terminal station receives the wavelength multiplexed optical signal, divides it into optical signals for the respective channels, and demodulates the optical signals. The ADM node is provided on the optical transmission path and includes a demultiplexer and a multiplexer. The demultiplexer demultiplexes the wavelength-multiplexed channel into channels having different wavelengths for branching/inserting a given channel. The multiplexer multiplexes the channels having different wavelengths. This optical transmission system is characterized in that an RZ pulse is used as the pulse signal representing the transmission information. Since RZ pulses are used as signals of digital data or transmission information, the optical signal waveforms are transmitted in the form of RZ pulses. Thus, the optical waveform distortion due to a wavelength misalignment between the wavelength of the light source and the transmission central wavelength of the multiplexer/demultiplexer can be reduced, the conditions for stability of wavelength transmission characteristics for the light source and multiplexer/demultiplexer can be relaxed, and the number of ADM nodes which can be inserted in the transmission path can be increased. Thereby the reliability and stability of the system can be enhanced.

As compared to the RZ pulse, the conventionally used NRZ pulse has a dense optical spectrum distribution from the carrier wavelength to the wavelength of the maximum modulation frequency. Consequently, an asymmetric optical spectrum distribution near the carrier wavelength due to the wavelength misalignment between the wavelength of the light source and the transmission central wavelength of the multiplexer/demultiplexer will result in an optical waveform distortion. The NRZ pulse has such a pulse waveform that the interval of unit codes is equal to the length of the pulse. The data waveform represents "0" in regions other than "1". When the NRZ pulse of this format is used, there are pulses of various widths, depending on the length of continuous "1" data in the signal sequence. Accordingly, signal components are uniformly distributed from a low region to a high region in the optical spectrum. If the balance of distribution between the low region and high region of the optical spectrum is lost, the pattern effect occurs conspicuously and the optical waveform distortion increases.

By contrast, in the optical transmission system using the wavelength division multiplex according to the first embodiment, the RZ pulse is used. In the format of the RZ pulse, the level is changed by information bit "1" (or changed to a predetermined level each time the codes "1" and "0" appear) and immediately the changed level is restored to the original level. The RZ pulses have the same shape, irrespective of the state of succession of "1" in the signal sequence. Although the RZ pulse has a broader optical spectrum distribution than the NRZ pulse, the optical spectrum concentrates at the carrier wavelength and the wavelength of the maximum modulation frequency.

The RZ pulse has a broad spectrum distribution, as mentioned above. Thus, even if a wavelength misalignment occurs between the wavelength of the light source and the transmission central wavelength of the multiplexer/demultiplexer and the optical spectrum distribution becomes asymmetrical, an optical waveform distortion does not occur so conspicuously as in the case of NRZ pulse, unless the spectrum concentration at the carrier wavelength and the wavelength of the maximum modulation frequency is considerably reduced. Since all RZ pulses have the same pulse shape, a pattern effect due to the signal sequence does not appear conspicuously. Merely the pulse width increases due to the limitation of the band. No great waveform distortion occurs.

Therefore, with use of the RZ pulses for optical transmission, the present invention can provide an optical transmission system using wavelength division multiplex, wherein the optical waveform distortion due to the wavelength misalignment between the wavelength of the light source and the transmission central wavelength of the multiplexer/demultiplexer can be reduced, the conditions for stability of wavelength transmission characteristics for the light source and multiplexer/demultiplexer can be relaxed, and the number of ADM nodes which can be inserted in the transmission path can be increased, whereby the reliability and stability of the system are enhanced.

The above embodiment relates to the technique for inserting a great number of ADM nodes in the transmission path, and this technique is achieved by the use of RZ pulses. However, mere use of RZ pulses cannot bring about a maximum advantage. The condition for bringing about the maximum advantage with use of the RZ pulses will now be considered.

(Second Embodiment)

A second embodiment of the present invention will now be described. An assumed transmission path model in the second embodiment is the same as that in the first embodiment. In the second embodiment, the above-mentioned object is achieved by devising the shape of the RZ pulse.

FIG. 8 shows four shapes of RZ pulses: a Gauss-type wave-shape pulse with a full-width at half-maximum of 30 ps; a Gauss-type wave-shape pulse with a full-width at half-maximum of 20 ps; a square pulse with a duty ratio of 50%; and a square pulse with a duty ratio of 30% (a rising and falling slope being 15%). Specifically, FIG. 8 shows eye penalties in relation to a wavelength misalignment $\Delta\lambda$ between a wavelength $\lambda$ADM of a light source and a wavelength $\lambda$LD of a multiplexer/demultiplexer. Since the band of the optical modulator for generating an optical signal is definite, a great deal of time is required at the rising and falling slopes of the square pulse, and a trapezoidal pulse is actually formed.

In this embodiment, a rising and falling slope time is set at 15% of a time slot of one bit. The penalty in this embodiment is a reception power penalty. Specifically, a minimum eye opening width obtained during a discrimination time period corresponding to 20% of the width of the time slot of one bit and an average "1"/"0" level difference in the discrimination are expressed by the unit of decibel (dB).

It is understood, as shown in FIG. 8, that in the case of the RZ pulse, an optical waveform degradation due to a wavelength misalignment is much less than that in the Gauss-type pulse and square pulse. In addition, since the optical spectrum distribution in the Gauss-type pulses and square pulses having the same shape becomes broader as the pulse width is narrower, the eye penalty with respect to the wavelength misalignment $\Delta\lambda$. In the prior art, square pulses with a duty ratio of 50% are generally used, but the degradation due to wavelength misalignment decreases as the duty ratio is lower.

The optical spectrum distribution of the square pulse is broader that that of the Gauss-type pulse, and thus the square pulse has a less eye penalty with respect to wavelength misalignment $\Delta\lambda$.

FIG. 9 shows eye penalties relative to wavelength lags when the rising and falling slopes of the square pulses are 20% and 5%. It is understood from FIG. 9 that the influence of the waveform distortion relative to the wavelength misalignment is less in the slope of 5% than in the slope of 20%. The reason is that the pulse having a shorter slope time and a nearly perfect square shape broadens the optical spectrum distribution of the optical signal.

In other words, if an optical modulator for generating an optical signal, which has a broader band, is used, the influence of wavelength misalignment can be reduced in this case, too. Specifically, the square pulse having a duty ratio of less than 50% should preferably be used as the RZ pulse.

As has been described above, the optical transmission system using wavelength division multiplex according to the second embodiment is characterized in that the square pulse is used as RZ pulse. The shapes of RZ pulses may generally be classified into "angled" and "square." The square pulse has a broader optical spectrum distribution than the angled-shape pulse represented by a Gauss-type pulse and a hyperbolic-type pulse. Accordingly, the influence of asymmetry of optical spectrum distribution due to a wavelength misalignment between the wavelength of the light source and the transmission central wavelength of the multiplexer/demultiplexer is small, and the optical waveform distortion can be suppressed most effectively.

The optical transmission system using wavelength division multiplex according to the second embodiment is also characterized in that the square pulse with a duty ratio of less than 50% is used as RZ pulse.

The square pulse has a broader optical spectrum distribution as the duty ratio thereof is lower and the pulse width is smaller. Accordingly, as regards the square pulse, the lower the duty ratio, the smaller the influence of asymmetry of optical spectrum distribution due to a wavelength misalignment between the wavelength of the light source and the transmission central wavelength of the multiplexer/demultiplexer and the less the optical waveform distortion.

If the square pulse having a duty ratio of less than 50% and having, desirably, a perfect square shape is used as RZ pulse, the optical waveform distortion due to the wavelength misalignment between the wavelength of the light source and the transmission central wavelength of the optical filter on the transmission path can be reduced as much as possible, and high-quality communication can be achieved. Moreover, the conditions for stability of wavelength transmission characteristics for the light source and multiplexer/demultiplexer can be relaxed, whereby the reliability and stability of the system are enhanced.

The above embodiment relates to the technique for inserting a large number of ADM nodes midway along the transmission path. However, there is a system in which no ADM node is used. Even in the case of the system wherein no ADM node is provided on the transmission path, an optical waveform degradation will also occur due to a wavelength misalignment between the wavelength of the light source and the transmission central wavelength of optical filters having a narrow transmission band, which are provided on the transmission path, or on the optical transmission terminal station side or optical reception terminal station side. In particular, in the case of a demultiplexer widely used for high-density wavelength multiplex, a plurality of channels are arranged in a wavelength region. Consequently, the transmission band for each channel is not sufficiently broader than the band of optical signals to be transmitted. In addition, it is technically difficult to make the wavelength of the light source coincide with the transmission central wavelength of the optical filter including the multiplexer/demultiplexer with respect to all channels. A third embodiment for overcoming these problems will now be described. According to the third embodiment, the optical waveform distortion due to the wavelength misalignment between the wavelength of the light source and the transmission central wavelength of the optical filter provided on the transmission path can be reduced, and the conditions for stability of wavelength transmission characteristics for the light source and optical filter can be relaxed, whereby the reliability and stability of the system are enhanced.

(Third Embodiment)

FIG. 10 shows a third embodiment of the present invention. In the third embodiment, the ADM nodes 6-1 to 6-M provided on the transmission path in FIG. 1 are replaced with optical fiber amplifiers 4. The structure shown in FIG. 10 is the same as that shown in FIG. 1 in the other respects, and a description of the common parts is omitted.

Figure 11:
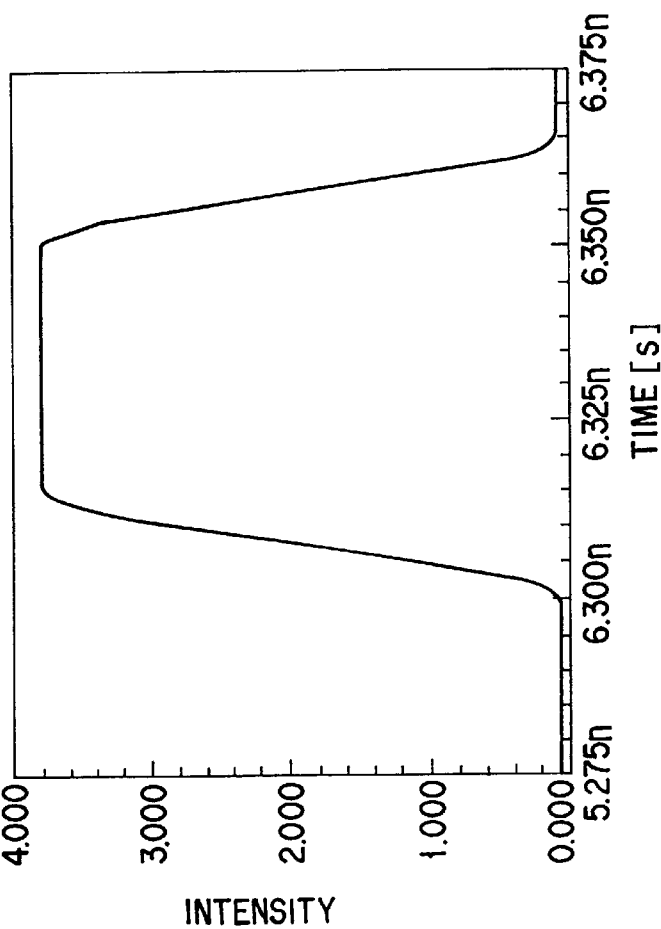
FIG. 11 shows an example of a rectangular RZ pulse used in the third embodiment of the invention.

In the optical transmission terminal station 1 shown in FIG. 10, the optical transmitters 2-1 to 2-N of the respective channels transmit optical signals S-1 to S-N, which are square-waveform RZ pulses as shown in FIG. 11, by means of carrier optical signals having different wavelengths for the respective channels. The optical signals S-1 to S-N of respective channels are wavelength-multiplexed by the multiplexer 3 having at respective ports a transmission band width narrower than the optical spectrum band of the optical signals S-1 to S-N. The multiplexed optical signal is passed through the optical fiber amplifier 4 within the optical and sent to the optical reception terminal station 7 over the optical fiber 5 or transmission path. The operation in the optical reception terminal station 7 in FIG. 10 is the same as that in the optical reception terminal station 7 in the first embodiment.

In the third embodiment, it is supposed that the transmission speed of each optical channel is 10 Gb/s and the 3 dB transmission band width of each port of the multiplexer 3 is 0.25 nm. The wavelengths of optical signals S-1 to S-N are initially set in accordance with the transmission central wavelengths of the respective ports of the multiplexer 3. It is possible, however, that a wavelength misalignment of the optical signal relative to the transmission central wavelength of the input port of the multiplexer 3 in any one of the channels will occur due to a variation in ambient temperature or a degradation with the passing of time of the multiplexer 3 and the light source within the optical transmitter 2-1, . . . , 2-N (i.e. the light source for generating continuous light of a predetermined frequency of an associated channel).

Figure 12A:
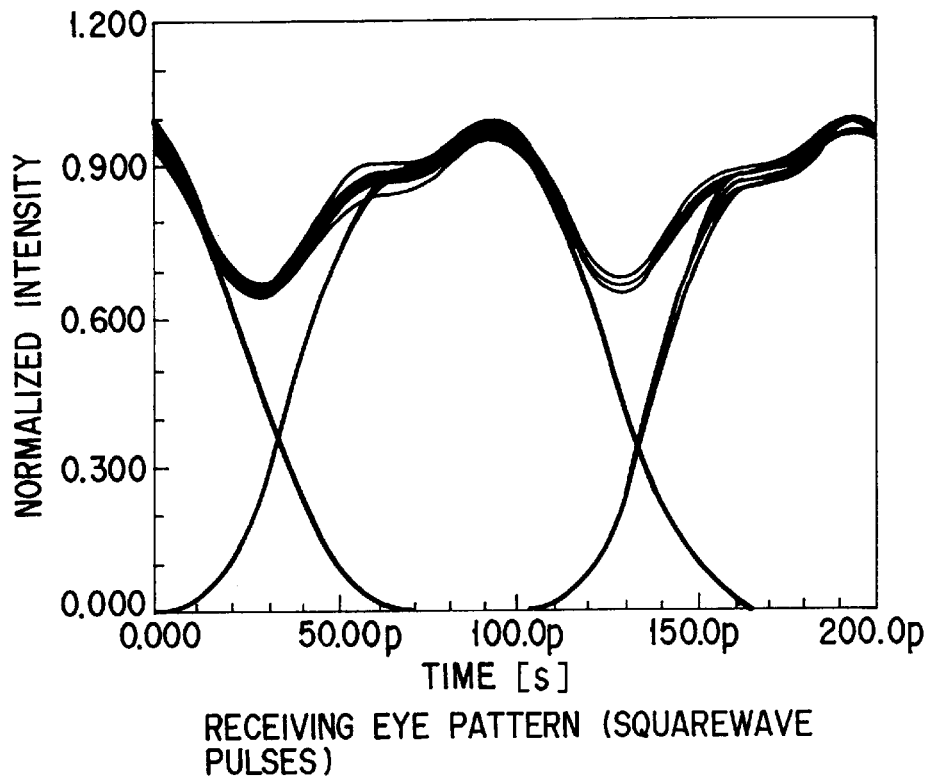
FIGS. 12A and 12B show eye patterns when a wavelength misalignment is 0.25 nm in the rectangular RZ pulse in the third embodiment of the invention and in an NRZ pulse.
Figure 12B:
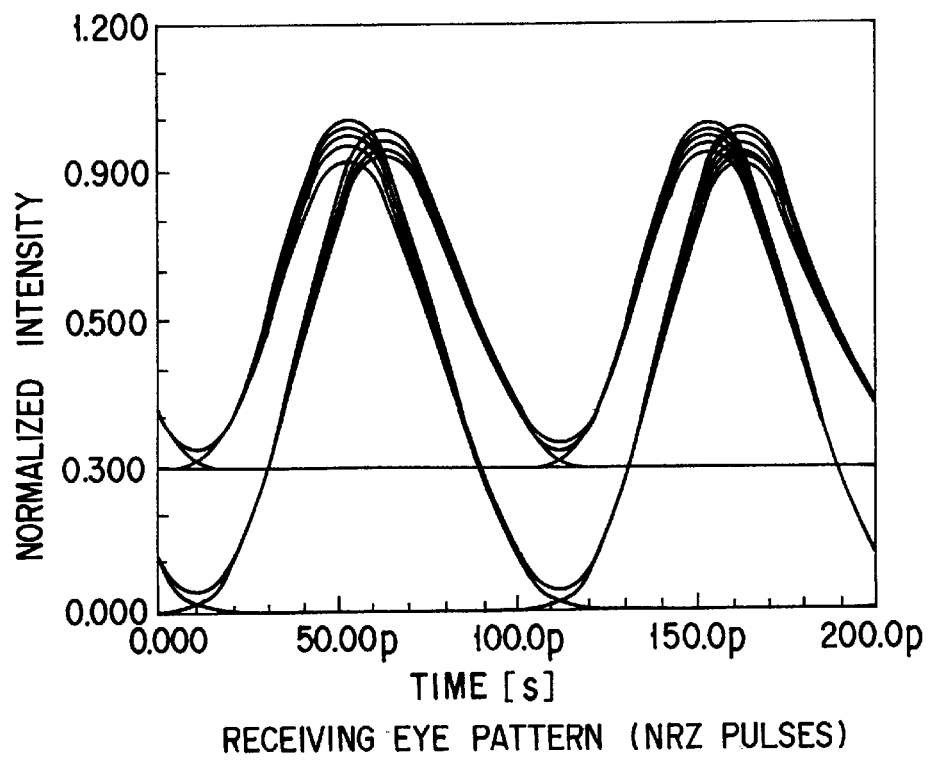

FIG. 12A shows an eye pattern at the time the square RZ pulse according to the present invention has been made incident on the optical fiber in the case where there is a wavelength misalignment of 0.25 nm between the wavelength of the light source and the transmission central wavelength of the multiplexer/demultiplexer in channel L ($1 \leq L \leq N$). FIG. 12B shows an eye pattern for comparison at the time the NRZ pulse has been made incident on the optical fiber under the same condition.

As shown in FIGS. 12A and 12B, an optical waveform degradation due to the wavelength misalignment is less in the case of RZ pulse than in the case of NRZ pulse. In a transmission system such as a wavelength multiplex optical transmission having a plurality of channels, it is considered that a wavelength misalignment between the wavelength of the light source and the transmission central wavelength of the multiplexer/demultiplexer occurs only in a specific channel because of various factors, and the possibility of occurrence of wavelength misalignment increases in proportion to the number of channels.

Under the circumstances, strict conditions are required for the stability of wavelength characteristics of the light source and multiplexer/demultiplexer, and the yield of manufactured devices decreases, resulting in a higher cost. By using the square-wave pulse having a less optical waveform degradation with respect to the wavelength lag, the conditions for stability of wavelength transmission characteristics for the light source and optical filter can be relaxed. As a result, the productivity of the device is enhanced, and the transmission characteristics are stabilized. Thus, an optical transmission system using wavelength division multiplex, which can perform stable, high-quality communication, can be provided at low cost.

In the optical transmission system using wavelength division multiplex according to the third embodiment, if the system includes a narrow-band optical filter such as a multiplexer/demultiplexer, whose band is not so wide as the band of the optical signal transmitted through the transmission path, the square-wave RZ pulse is used as a pulse signal of digital data to be transmitted.

The square-wave RZ pulse, as compared to triangular pulses represented by NRZ pulse and Gauss-wave pulse, has a broader optical spectrum distribution. Thus, even if a wavelength misalignment occurs between the wavelength of the light source and the transmission central wavelength of the narrow-band optical filter, the influence of asymmetry of the optical spectrum distribution is small and the optical waveform distortion can be reduced.

In the high-density wavelength multiplex optical communication system wherein no ADM node is provided on the transmission path, the demultiplexer widely used, in particular, for high-density wavelength multiplex does not have a sufficiently broader transmission band for each channel than the band of optical signals transmitted, since a plurality of channels are densely arranged in the wavelength region. It is technically difficult, therefore, to make the wavelength of the light source coincide with the transmission central wavelength of the optical filter including the multiplexer/demultiplexer with respect to all channels. According to the present embodiment, however, even when a wavelength misalignment has occurred between the wavelength of the light source and the transmission central wavelength of the narrow-band optical filter, the influence due to asymmetry of the optical spectrum distribution can be reduced and the optical waveform distortion can be suppressed. Therefore, the conditions for stability of wavelength transmission characteristics for the light source and optical filter can be relaxed, whereby the reliability and stability of the system are enhanced.

In the above embodiment, the square-wave RZ pulses are used as optical pulses having pulse waveforms of an equal full-width at half-maximum. In the case of hyperbolic secant type RZ pulses, which are examples of special RZ pulses, although these are triangular pulses, even if a wavelength misalignment has occurred under specific conditions between the wavelength of the light source and the transmission central wavelength of the narrow-band optical filter, the influence due to asymmetry of the optical spectrum distribution can be reduced and the optical waveform distortion can be suppressed. Therefore, the conditions for stability of wavelength transmission characteristics for the light source and optical filter can be relaxed, whereby the reliability and stability of the system are enhanced.

An example of this case will now be described as a fourth embodiment of the present invention.

(Fourth Embodiment)

A fourth embodiment of the present invention will now be described. In the case where a narrow-band optical filter such as a multiplexer/demultiplexer, whose band is not so wide as the band of the optical signal transmitted through the optical transmission path, is provided on the optical transmission path, it is better to use triangular waveform RZ pulses in a region where the peak power P is less than a Ps (described later) and a self-phase-modulation effect due to a non-linear effect of the optical fiber is ignorable. Specifically, in the case of triangular waveform RZ pulses, as compared to the NRZ pulses, the influence of asymmetry of optical spectrum distribution is small when a wavelength misalignment has occurred between the wavelength of the light source and the transmission central wavelength of the narrow-band optical filter. Because of this feature, the optical waveform distortion can be suppressed.

In this case, $Ps=(0.776\lambda^3 Aeff\ D)/(\pi^2 n_2 c to^2)$

The present system is constructed such that the formula, $fsig - fADM \geq \Delta B/2$, is satisfied, wherein fsig is the optical frequency of a predetermined optical signal for a predetermined channel of the multiplexer/demultiplexer, fADM is the center frequency of transmission band for the optical signal of the multiplexer/demultiplexer, and $\Delta B$ (unit=Hz) is the 3 dB bandwidth of the transmission band of the transmission band.

In this case, $\lambda$ is the wavelength, Aeff is the effective core area are of the optical fiber of the optical transmission path, D is the chromatic dispersive value of the optical fiber, $n_2$ is the non-linear refractive index of the optical fiber, c is the optical velocity, and the to is the full-width at half-maximum of the optical pulse (FWHM).

The fourth embodiment will now be described in greater detail. Suppose that the transmission path model used in the fourth embodiment is the same as that used in the third embodiment. In other words, the ADM nodes 6-1 to 6-M provided on the transmission path in FIG. 1 are replaced with optical fiber amplifiers 4, as shown in FIG. 10. It is assumed that the transmission speed of each channel is 10 Gb/s, and the waveform of the optical signal is that of the sech-type RZ pulse with an FWHM of 20 ps.

FIG. 14 shows eye penalties in the case where the 3 dB transmission band width of each input port of the multiplexer/demultiplexer 3 is 0.25 nm and a wavelength misalignment has occurred between the transmission central wavelength and the optical signal wavelength of the input port of a certain channel of the multiplexer 3. FIG. 14 shows eye penalties in the case of using sech-type RZ pulses and NRZ pulses.

As seen from the characteristic curves in FIG. 14, the sech-type RZ pulse, as compared to the NRZ pulse, has a less optical waveform degradation relative to the wavelength misalignment and has a greater allowance for the wavelength lag.

L. F. Mollenauer, et al. published soliton transmission in which the transmission central wavelength of the optical filter of the transmission path is being slid, in "The sliding-frequency guiding filter: an improved form of soliton fitter control", Opt. Lett. 17, pp. 1575–1577, 1992. The term "soliton" refers to a wave propagating without energy dispersion, like a laser beam propagating through a waveguide without chromatic dispersion.

This document includes a description to the effect that even if optical filters are discretely inserted in a transmission path at intervals sufficiently less than a dispersive distance and the transmission central wavelength of the optical filters is shifted in proportion to the transmission distance, the sech-type pulse, which is a special case of the RZ pulse, may have an intensity greater than the Ps which is the soliton condition, and the sech-type pulses can be reproduced successively by making use of a self-phase-modulation effect which is a non-linear characteristic of the optical fiber.

The optical transmission system using the wavelength division multiplex according to the fourth embodiment is characterized in that when transmission information for each channel is converted to a pulse signal and a carrier optical signal having a specific wavelength for each channel, which is generated from a light source, is modulated and multiplexed by using the pulse signal representing the transmission information of each channel, a triangular RZ pulse such as a sech-type pulse is used as the pulse signal. The optical transmission system using the wavelength division multiplex according to the fourth embodiment has been made, with attention paid to the fact that when the transmission path has a narrow-band band limit characteristic with a transmission central wavelength different from the wavelength of a light source for generating the carrier optical signal, the triangular-wave RZ pulse such as a sech-type pulse or the square-wave RZ pulse, which does not meet the soliton condition, is much less influenced by the optical waveform distortion, as compared to the NRZ pulse.

According to the fourth embodiment, even when a wavelength misalignment has occurred between the transmission central wavelength of the narrow-band optical filter and the wavelength of the light source, the influence due to asymmetry of optical spectrum distribution can be reduced and the optical waveform distortion suppressed. Thus, the conditions for stability of wavelength transmission characteristics for the light source and optical filter can be relaxed, whereby the reliability and stability of the system are enhanced.

The optical transmission system using the wavelength division multiplex according to the fourth embodiment has been made by making use of the following feature. In the case where a narrow-band optical filter such as a multiplexer/demultiplexer, whose band is not so wide as the band of the optical signal transmitted through the optical transmission path, is provided on the optical transmission path, the triangular waveform RZ pulses are used. In the region where the peak power P is less than the aforementioned Ps and a self-phase-modulation effect due to a non-linear effect of the optical fiber is ignorable, the triangular waveform RZ pulses, as compared to the NRZ pulses, are less influenced by asymmetry of optical spectrum distribution when a wavelength misalignment has occurred between the wavelength of the light source and the transmission central wavelength of the narrow-band optical filter.

A fifth embodiment of the invention, in which, too, the influence of asymmetry of optical spectrum distribution, when a wavelength misalignment has occurred between the wavelength of the light source and the transmission central wavelength of the narrow-band optical filter, can be reduced and the optical waveform distortion can be suppressed, will be described below.

(Fifth Embodiment)

In the fifth embodiment, too, the same transmission path model as in the fourth embodiment is used. In the fifth embodiment, codes for using optical pulses with an equal FWHM for all optical signals to be transmitted are applied to the optical transmitters 2-1 to 2-N of respective channels. In other words, codes for using, as pulse signals, optical pulses having an equal FWHM are applied.

An example of such codes is a PPM (Pulse-Position-Modulation) code for transmitting a signal at a position of a transmission time slot of an optical pulse. A guard time is provided between slots, whereby optical pulses with an equal FWHM can be used irrespective of a signal sequence.

Codes, as shown in FIGS. 15A and 15B, may also be used. When a signal sequence varies, i.e. when "0" changes to "1" and vice versa, carrier optical signals are modulated by using optical pulses having an full-width at half-maximum (FWHM) corresponding to half the slot width, and the modulated signals are transmitted.

In the optical transmission system using the wavelength division multiplex to which the above codes are applied, even if a wavelength misalignment has occurred between the wavelength of the light source and the transmission central wavelength of the multiplexer/demultiplexer, the optical pulses to be transmitted have the same shape. Thus, like the first to fourth embodiments, the pattern effect due to the signal sequence is much less than in the case of conventional NRZ pulse, and the optical waveform distortion alone can be suppressed.

As has been described above, in the optical transmission system using the wavelength division multiplex according to the fifth embodiment, when the narrow-band optical filter such as a multiplexer/demultiplexer, whose band is not so wide as the band of the optical signal transmitted through the optical transmission path, is provided on the optical transmission path, codes for using optical pulses with an equal full-width at half-maximum (FWHM) (a distance between two points, corresponding to half the maximum value in a distribution curve having a single maximum value) for all optical signals to be transmitted are applied. When NRZ pulses are used as optical signals to be transmitted, optical pulses with various FWHMs will occur due to the number of successive "1" values in the signal sequence. Consequently, when a wavelength misalignment has occurred between the wavelength of the light source and the transmission central wavelength of the narrow-band optical filter, the resultant pattern effect is great and the optical waveform distortion increases.

However, in the encoded optical signal waveform according to the fifth embodiment, the optical pulses have the same shape irrespective of the signal sequence. Thus, the influence due to pattern effect can be reduced and the waveform distortion can be suppressed.

(Sixth Embodiment)

Figure 16:
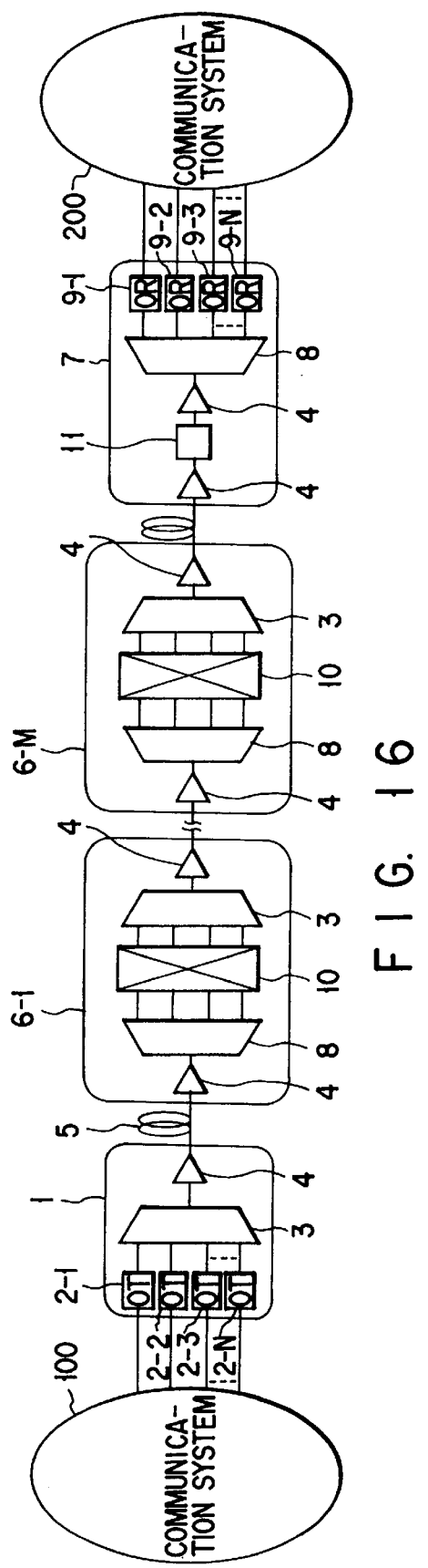
FIG. 16 schematically shows the structure of a system according to a sixth embodiment of the invention.

A sixth embodiment of the invention will now be described. FIG. 16 shows the structure of the sixth embodiment. This structure is the same as that shown in FIG. 1, except for the reception terminal station 7. The description of FIG. 1 should be referred to with respect to the common parts. In FIG. 16, it is assumed that the optical fiber 5 constituting the transmission path is an ordinary dispersive fiber having a group speed dispersion of +18 ps/nm/km, and that ADM nodes 6-1 to 6-M are inserted in the transmission path at intervals of 50 km.

In this embodiment, a dispersion compensator 11 is inserted in front of the optical demultiplexer 8 within the reception terminal station 7 in order to compensate a distortion of optical waveform due to group speed dispersion of optical fiber 5. The dispersion compensator 11 is, for example, a dispersive compensation fiber or a grating fiber.

The optical signal transmission speed of each channel, 1 to N, is 2.5 Gb/s, and the 3 dB transmission band width of each port of the multiplexer/demultiplexer is 0.4 nm.

Suppose that a wavelength misalignment of 0.15 nm has occurred between the wavelength of the light source and the transmission central wavelength of the multiplexer/demultiplexer in channel L ($1 \leq L \leq N$). The number of ADM nodes inserted in the transmission path is M=7. The dispersive compensator 11 inserted in the reception terminal station 7 has a dispersion of −7200 ps/nm in order to compensate a group speed dispersion +18 ps/nm/km×(50×8) km which the transmitted optical signal undergoes through the optical fiber.

Figure 17:
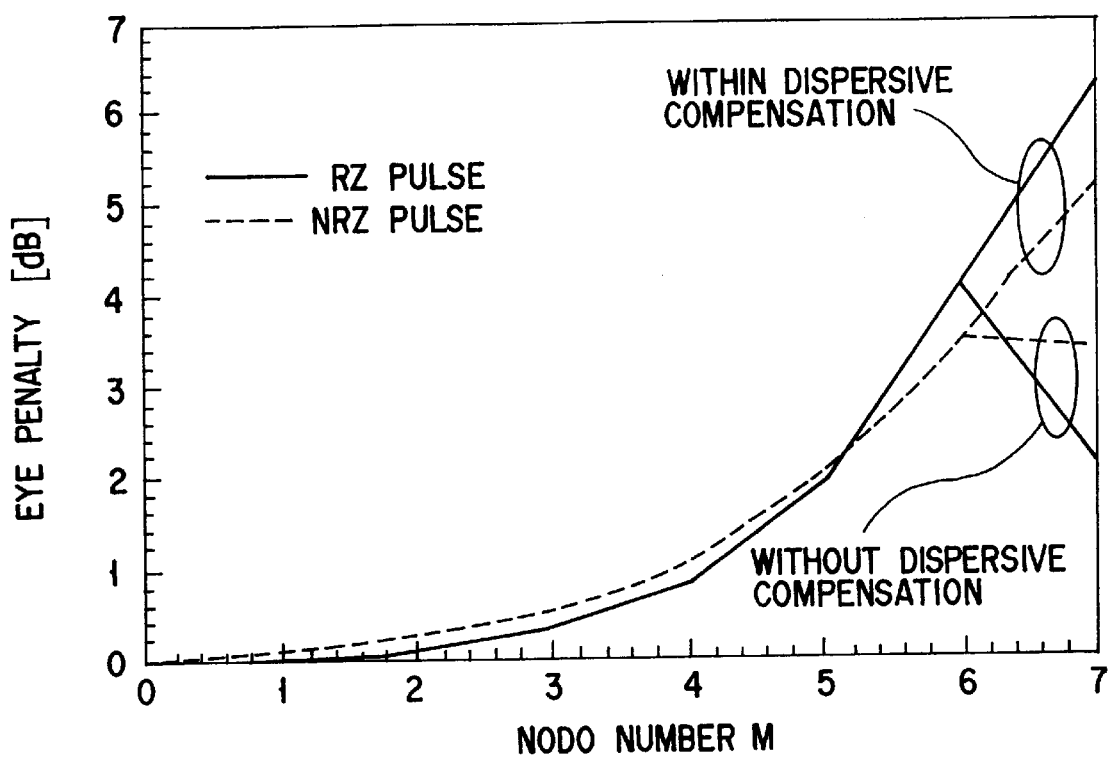
FIG. 17 illustrates eye penalty characteristics in relation to the number of ADM nodes in the sixth embodiment in cases where there is dispersive compensation and there is no dispersive compensation in a reception terminal when an RZ pulse and an NRZ pulse are used.

FIG. 17 shows eye penalties in the case where the square-wave RZ pulse (duty ratio=50%; slope=15%) according to the present invention, as compared to the NRZ pulse, is used, with the number M of ADM nodes being plotted in the horizontal axis.

It is understood, from the above descriptions of the first to fifth embodiments, that the RZ pulse, as compared to the NRZ pulse, has a less waveform distortion relative to the wavelength lag. However, when the transmission path is the ordinary dispersion fiber having a great group speed dispersion, the RZ pulse, which has a broader signal band than the NRZ pulse, undergoes a greater influence of group speed dispersion of the optical fiber, as shown in FIG. 17. As the transmission distance increases, the waveform distortion increases.

Even in a case, too, where the transmission path is a dispersive shift fiber having a low group speed dispersion, the group dispersion is accumulated as the transmission distance increases, which results in a great waveform distortion. This cancels the merit that the RZ pulse, as compared to the NRZ pulse, has a less waveform distortion relative to the wavelength lag.

According to the sixth embodiment of the invention, the dispersive compensator 11 having a group speed dispersion with a sign opposite to the sign of the group speed dispersion of the optical fiber 5 is inserted in the reception terminal station 7. Thus, even when a wavelength misalignment has occurred between the wavelength of the light source and the transmission central wavelength of the multiplexer/demultiplexer, the waveform distortion due to the accumulated group speed dispersion can be compensated.

The dispersive compensation can bring about the merit of the RZ pulse which has a less waveform distortion relative to the wavelength lag.

(Seventh Embodiment)

There are two methods of compensating group speed dispersion caused by the transmission path. In one method, as in the sixth embodiment, the group speed dispersion accumulated from the transmission terminal station is compensated at a time in the reception terminal station. In the other method, the group speed dispersion is separately compensated at respective ADM nodes.

A seventh embodiment of the invention relates to a method of compensating a group speed dispersion which the optical signal undergoes through the optical fiber over a distance up to each of the ADM nodes.

Figure 18:
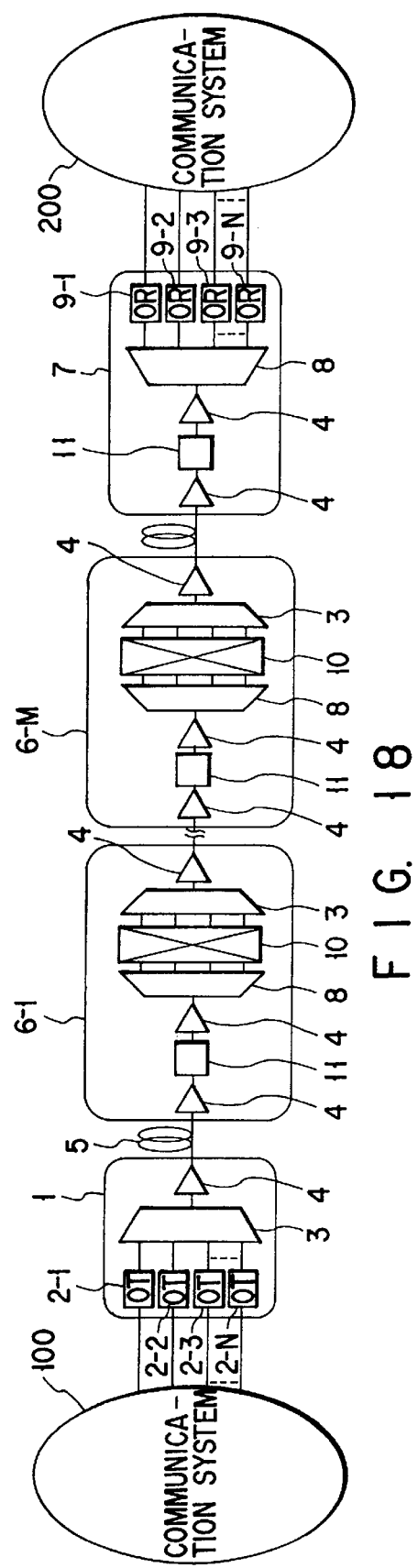
FIG. 18 schematically shows the structure of a system according to a seventh embodiment of the invention.

FIG. 18 shows the structure of the seventh embodiment. This structure is the same as that shown in FIG. 1, except for the ADM nodes 6-1 to 6-M and the reception terminal station 7. The description of FIG. 1 should be referred to with respect to the common parts. In the structure of FIG. 18, like the structure in FIG. 16, it is assumed that the optical fiber 5 constituting the transmission path is an ordinary dispersive fiber having a group speed dispersion of +18 ps/nm/km, and that ADM nodes 6-1 to 6-M are inserted in the transmission p a th at intervals of 50 km.

Dispersion compensators 11 are inserted in front of the o ptical demultiplexers 8 within ADM nodes 6-1 to 6-M and the reception terminal station 7 in order to compensate a distortion of optical waveform due to group speed dispersion of optical fiber 5. The optical signal transmission speed of each channel, 1 to N, is 2.5 Gb/s, and the 3 dB transmission band width of each port of the multiplexer-demultiplexer is 0.4 nm.

Suppose that a wavelength misalignment of 0.15 nm has occurred between the wavelength of the light source and the transmission central wavelength of the multiplexer/demultiplexer in channel L ($1 \leq L \leq N$). The number of ADM nodes inserted in the transmission path is M=10. Each dispersive compensator 11 inserted in the ADM nodes 6-1 to 6-M and reception te rminal station 7 has a dispersion of −900 ps/n m in order to compensate a group speed dispersion +18 ps/nm/km×50 km which the transmitted optical signal undergoes through the input-side optical fiber.

Figure 19:
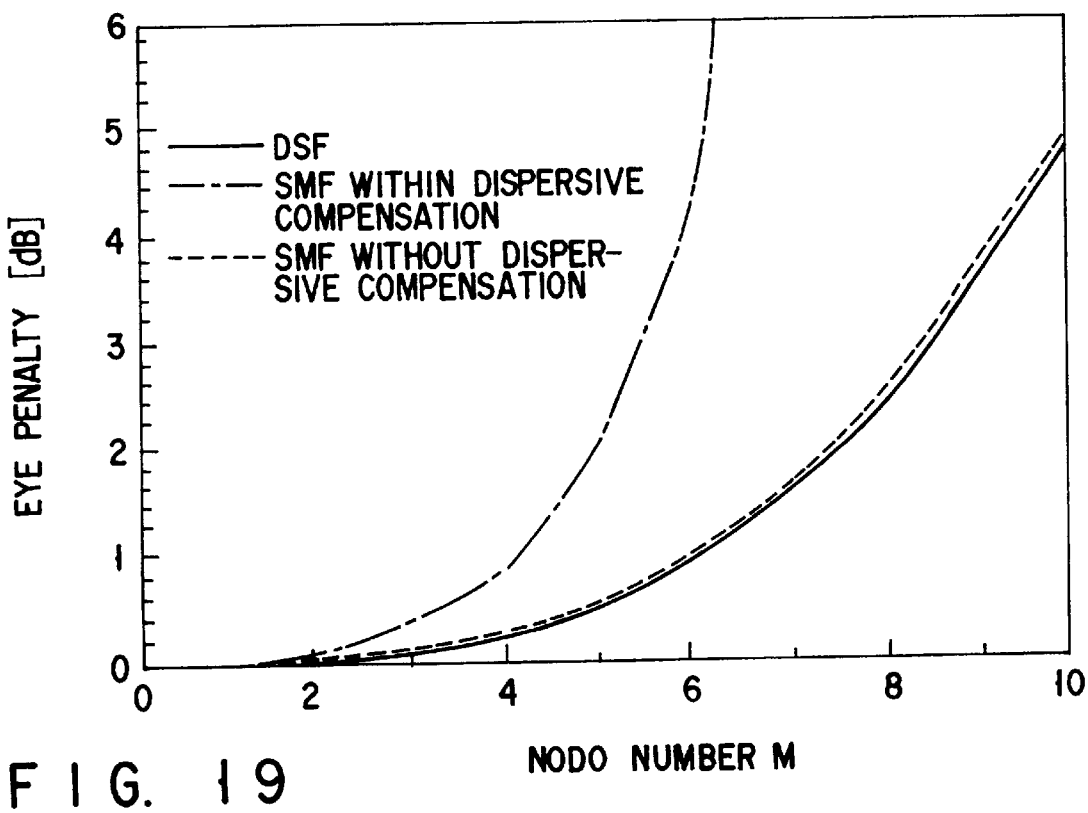
FIG. 19 illustrates eye penalty characteristics in relation to the number of ADM nodes in the seventh embodiment in cases where there is dispersive compensation and there is no dispersive compensation in each ADM node when an RZ pulse is used.

FIG. 19 shows eye penalties in the case where dispersive compensation is made and is not made in the square-wave RZ pulse (duty ratio=50%; slope=15%) according to the present invention, with the number M of ADM nodes being plotted in the horizontal axis, as compared to the case where a dispersive shift fiber (DSF) having a group speed dispersion +0.4 ps/nm/km is used as the transmission path.

As is understood from FIG. 19, even when a wavelength misalignment has occurred between the wavelength of the light source and the transmission central wavelength of the multiplexer/demultiplexer, dispersion is separately compensated in the respective ADM nodes 6-1 to 6-M and reception terminal station 7 and thus the optical signal can be transmitted through the transmission path or the ordinary dispersive fiber 5 having a great group speed dispersion, with the same-level degradation due to the wavelength misalignment as the dispersive shift fiber.

As has been described above, according to the present invention, in the optical transmission system using wavelength division multiplex and having ADM nodes in the transmission path, RZ pulses are used for transmission optical signals. Thereby, the optical waveform distortion due to the wavelength misalignment between the wavelength of the light source and the transmission central wavelength of the multiplexer/demultiplexer can be remarkably reduced. Accordingly, the conditions for stability of wavelength transmission characteristics for the light source and multiplexer/demultiplexer can be relaxed. In addition, the optical waveform distortion due to the narrowing of transmission band in proportion to the number of inserted ADM nodes can be reduced. The number of ADM nodes to be inserted in the transmission path can be increased.

In the high-density wavelength multiplex optical transmission, RZ pulses are used as transmission optical signals for the narrow-band optical filter provided in the transmission path. Alternatively codes for using optical pulses with an equal full-width at half-maximum are applied. Thereby, the optical waveform distortion due to the wavelength misalignment between the wavelength of the light source and the transmission central wavelength of the multiplexer/demultiplexer can be remarkably reduced.

The present invention can provide a flexible, large-capacity optical transmission system using wavelength division multiplex, wherein high reliability and stability is ensured with respect to a variation in the wavelength of a light source and transmission wavelength characteristics of an optical filter such as a multiplexer/demultiplexer, and a large number of ADM nodes can be provided. With this system, an optical network matching with multimedia information-oriented societies can be easily realized.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A system for transmitting, over an optical transmission path using an optical fiber, wavelength-multiplex signals of a plurality of channels to which different wavelengths are assigned, the system comprising:

an optical transmission terminal station for transmitting the wavelength-multiplex signals to the optical transmission path;

an optical reception terminal station for receiving the wavelength-multiplex signals from the optical transmission path; and at least one of Add/Drop-Multiplexer nodes each including at least a demultiplexer unit for demultiplexing a plurality of channels to a channel in accordance with a given wavelength and a multiplexer unit for multiplexing a plurality of channels in accordance with a given wavelength;

wherein optical pulses having pulse waveforms with an equal full-width at half-maximum are applied to the optical signals.

2. The system according to claim 1, further comprising an erbium-doped fiber amplifier provided on the optical transmission path, wherein a signal intensity P (unit=W) of a peak in the outputs of the optical transmission terminal station and the erbium-doped optical fiber amplifier satisfies the condition of P<Ps, when Ps (unit=W)=$(0.776\lambda^3 \text{Aeff } D)/(\pi^2 n_2 c t o^2)$, wherein $\lambda$ (unit=m) is a wavelength, Aeff (unit=$m^2$) is an effective core area of the optical fiber of the optical transmission path, D (unit=s/m/m) is a chromatic dispersive value of the optical fiber, $n_2$ (unit $m^2$/W) is a non-linear refractive index of the optical fiber, c (unit=m/s) is a velocity of light, and to (unit=S) is a full-width at half-maximum, and optical pulses having pulse waveforms with an equal full-width at half-maximum are applied to the optical signals.

3. The system according to claim 2, wherein a formula, fsig−fADM$\geq \Delta$B/2, is satisfied, wherein fsig (unit=Hz) is an optical frequency of a predetermined optical signal for a predetermined channel of the multiplexer and demultiplexer, fADM (unit=Hz) is a center frequency of transmission band for the optical signal of the multiplexer and demultiplexer, and $\Delta$B (unit=Hz) is a 3 dB bandwidth of the transmission band.

4. The system according to claim 2, further comprising compensation means, provided in the transmission path and/or the reception terminal station, for compensating a waveform distortion caused by the optical fiber constituting the optical transmission path.

5. The system according to claim 1, wherein said optical reception terminal station includes means for reversely converting the optical pulses having pulse waveforms with an equal full-width at half maximum to original information, and said optical transmission terminal station includes means for converting information supplied from the outside to optical pulses having pulse waveforms with an equal full-width at half-maximum.

6. The system according to claim 1, wherein said optical pulses having pulse waveforms with an equal full-width at half-maximum are RZ (return-to-zero) format of information supplied from the outside.

7. The system according to claim 6, further comprising an erbium-doped fiber amplifier provided on the optical transmission path, wherein a signal intensity P (unit=W) of a peak in the outputs of the optical transmission terminal station and the erbium-doped optical fiber amplifier satisfies the condition of P<Ps, when Ps (unit=W)=$(0.776\lambda^3$ Aeff D$)/(\pi^2 n_2 c t o^2)$, wherein $\lambda$ (unit=m) is a wavelength, Aeff (unit=$m^2$) is an effective core area of the optical fiber of the optical transmission path, D (unit=s/m/m) is a chromatic dispersive value of the optical fiber, $n_2$ (unit $m^2$/W) is a non-linear refractive index of the optical fiber, c (unit=m/s) is a velocity of light, and to (unit=S) is a full-width at half-maximum, and optical pulses having pulse waveforms with an equal full-width at half-maximum are applied to the optical signals.

8. The system according to claim 6, wherein a formula, fsig–fADM$\geq\Delta$B/2, is satisfied, wherein fsig (unit=Hz) is an optical frequency of a predetermined optical signal for a predetermined channel of the multiplexer and demultiplexer, fADM (unit=Hz) is a center frequency of transmission band for the optical signal of the multiplexer and demultiplexer, and $\Delta$B (unit=Hz) is a 3 dB bandwidth of the transmission band.

9. The system according to claim 6, further comprising compensation means, provided in the transmission path and/or the reception terminal station, for compensating a waveform distortion caused by the optical fiber constituting the optical transmission path.

10. The system according to claim 6, wherein said optical pulses having pulse waveforms with an equal full-width at half-maximum are square-wave pulses.

11. The system according to claim 6, wherein each of said optical pulses having pulse waveforms with an equal full-width at half-maximum has a duty ratio of less than 50%.

12. A method for transmitting and receiving, over an optical transmission path using an optical fiber, wavelength-multiplex signals of a plurality of channels to which different wavelengths are assigned, wherein when a plurality of channels in accordance with a given wavelength on the optical transmission path is demultiplexed and a plurality of channels in accordance with a given wavelength is multiplexed, optical pulses having pulse waveforms with an equal full-width at half-maximum are applied to the optical signals.

13. A method for transmitting and receiving, over an optical transmission path using an optical fiber, wavelength-multiplex signals of a plurality of channels to which different wavelengths are assigned, wherein when a plurality of channels in accordance with a given wavelength on the optical transmission path is demultiplexed and a plurality of channels in accordance with a given wavelength is multiplexed, and when the wavelength-multiplex optical signal transmitted over the optical transmission path is amplified by an erbium-doped optical fiber amplifier, a signal intensity P (unit=W) of a peak in the outputs of the optical transmission terminal station and the erbium-doped optical fiber amplifier satisfies the condition of P<Ps (unit=W), when Ps=$(0.776\lambda^3$ Aeff D$)/(\pi^2 n_2 c t o^2)$, wherein $\lambda$ (unit=m) is a wavelength, Aeff (unit=$m^2$) is an effective core area of the optical fiber of the optical transmission path, D (unit=s/m/m) is a chromatic dispersive value of the optical fiber, $n_2$ (unit=$m^2$/n) is a non-linear refractive index of the optical fiber, c (unit=m/s) is a velocity of light, and to (unit=S) is a full-width at half-maximum, and optical pulses having pulse waveforms with an equal full-width at half-maximum are applied to the optical signals.

14. A method for transmitting and receiving, over an optical transmission path using an optical fiber, wavelength-multiplex signals of a plurality of channels to which different wavelengths are assigned, wherein when the wavelength-multiplex signals transmitted over the optical transmission path is multiplexed/demultiplexed by a multiplexer/demultiplexer and the multiplexed/demultiplexed optical signal is amplified by an erbium-doped fiber amplifier, a formula, fsig–fADM$\geq\Delta$B/2, is satisfied, wherein fsig (unit=Hz) is an optical frequency of a predetermined optical signal for a predetermined channel of the multiplexer and demultiplexer, fADM (unit=Hz) is a center frequency of transmission band for the optical signal of the multiplexer and demultiplexer, and $\Delta$B (unit=Hz) is a 3 dB bandwidth of the transmission band.

15. A method for transmitting and receiving, over an optical transmission path using an optical fiber, wavelength-multiplex signals of a plurality of channels to which different wavelengths are assigned, wherein when a plurality of channels in accordance with a given wavelength on the optical transmission path is demultiplexed and a plurality of channels in accordance with a given wavelength is multiplexed, and when the wavelength-multiplex optical signal transmitted over the optical transmission path is amplified by an erbium-doped optical fiber amplifier, a signal intensity P (unit=W) of a peak in the outputs of the optical transmission terminal station and the erbium-doped optical fiber amplifier satisfies the condition of P<Ps (unit=W), when Ps=$(0.776\lambda^3$ Aeff D$)/(\pi^2 n_2 c t o^2)$, wherein $\lambda$ (unit=m) is a wavelength, Aeff (unit=$m^2$) is an effective core area of the optical fiber of the optical transmission path, D (unit=s/m/m) is a chromatic dispersive value of the optical fiber, $n_2$ (unit=$m^2$/n) is a non-linear refractive index of the optical fiber, c (unit=m/s) is a velocity of light, and to (unit=S) is a RZ pulses, and optical pulses having an equal full-width at half maximum with RZ format of information.

16. A method for transmitting and receiving, over an optical transmission path using an optical fiber, wavelength-multiplex signals of a plurality of channels to which different wavelengths are assigned, wherein said optical pulses having pulse waveforms with an equal RZ pulses are applied to the optical signals, wherein when the wavelength-multiplex signals transmitted over the optical transmission path is multiplexed/demultiplexed by a multiplexer/demultiplexer and the multiplexed/demultiplexed optical signal is amplified by an erbium-doped fiber amplifier, a formula, fsig−fADM≧ΔB/2, is satisfied, wherein fsig (unit=Hz) is an optical frequency of a predetermined optical signal for a predetermined channel of the multiplexer and demultiplexer, fADM (unit=Hz) is a center frequency of transmission band for the optical signal of the multiplexer and demultiplexer, and ΔB (unit=Hz) is a 3 dB bandwidth of the transmission band.

* * * * *